United States Patent
Leung

(10) Patent No.: US 6,388,655 B1
(45) Date of Patent: May 14, 2002

(54) METHOD OF TOUCH CONTROL OF AN INPUT DEVICE AND SUCH A DEVICE

(76) Inventor: Wing-Keung Leung, 26 Longford Crescent, Scarborough, Ontario (CA), M1W 1P4

( * ) Notice: Subject to any disclaimer, the term of this patent is extended or adjusted under 35 U.S.C. 154(b) by 0 days.

(21) Appl. No.: 09/435,694

(22) Filed: Nov. 8, 1999

(51) Int. Cl.$^7$ .............................................. G06F 3/033
(52) U.S. Cl. ........................ 345/157; 345/156; 345/161; 345/173; 345/174; 341/34
(58) Field of Search ................. 345/156, 157, 345/161, 173, 174; 341/34

(56) References Cited

U.S. PATENT DOCUMENTS

| | | | |
|---|---|---|---|
| 4,094,192 A | 6/1978 | Watson et al. ................. 73/133 |
| 4,550,316 A | 10/1985 | Whetstone et al. .......... 340/710 |
| 4,763,531 A | 8/1988 | Dietrich et al. ........... 73/862.04 |
| 4,836,034 A | 6/1989 | Izumi et al. ............. 73/862.04 |
| 4,963,858 A | 10/1990 | Chien .......................... 340/710 |
| 5,335,557 A | 8/1994 | Yasutake ................ 73/862.043 |
| 5,508,719 A | 4/1996 | Gervais ....................... 345/157 |
| 5,565,657 A | 10/1996 | Merz ............................ 178/18 |
| 5,764,219 A | 6/1998 | Rutledge et al. ............. 345/159 |
| 5,790,102 A | 8/1998 | Nassimi ....................... 345/163 |
| 5,793,354 A | 8/1998 | Kaplan ........................ 345/157 |
| 5,805,137 A | 9/1998 | Yasutake .................... 345/156 |
| 5,815,139 A | 9/1998 | Yoshikawa et al. ......... 345/157 |
| 5,854,625 A | 12/1998 | Frisch et al. ................. 345/173 |
| 5,872,320 A | 2/1999 | Kamentser et al. ..... 73/862.044 |
| 5,883,617 A | 3/1999 | Yoshikawa ................... 345/157 |

FOREIGN PATENT DOCUMENTS

| | | | |
|---|---|---|---|
| CA | 2203387 | 5/1996 | |
| WO | WO 92/18927 | 10/1992 | ........... G06F/3/033 |
| WO | WO98/06079 | 2/1998 | |
| WO | WO 00/68917 | 11/2000 | ........... G09B/21/00 |

OTHER PUBLICATIONS

Anant Kartik Mithal and Sarah A. Douglas, Differences in Movement Microstructure of the Mouse and the Finger-–Controlled Isometric Joystick, Apr. 16, 1998, p. 1 to 13.

*Primary Examiner*—Bipin Shalwala
*Assistant Examiner*—Vincent E. Kovalick
(74) *Attorney, Agent, or Firm*—Piasetzki & Nenniger

(57) ABSTRACT

A touch control input method and a device is disclosed for controlling cursor movement on a computer screen or for controlling object movement of an apparatus such as a machine or a robot. A user-manipulable member having an exterior contact surface of known configuration is provided to sense the motion of a user through the physical contact with the contact surface. User contact on the contact surface is transmitted to a force sensing means disposed between the user-manipulable member and a support. The movement of the user contact on the contact surface are derived from the signals output from the force sensing means. The contact force may be used as a means to determine the object's motion and response sensitivity simultaneously, while providing kinesthetic and tactile feedback to the user.

29 Claims, 17 Drawing Sheets

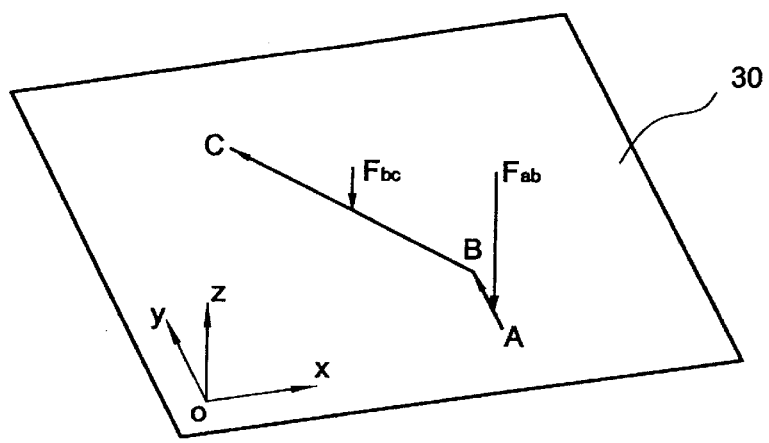
FIG. 2a
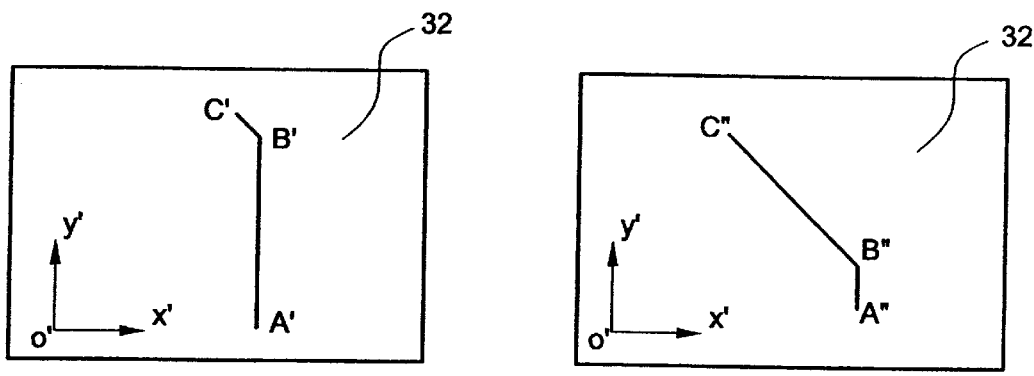
A'B' = $k F_{ab} AB$
B'C' = $k F_{bc} BC$
FIG. 2b          FIG. 2c

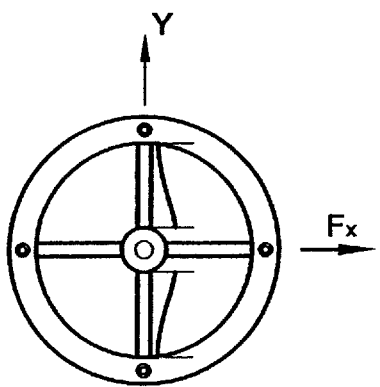
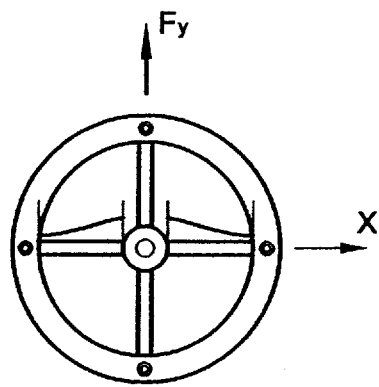
FIG. 9a            FIG. 9b
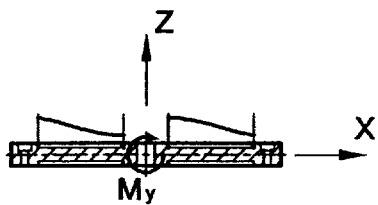
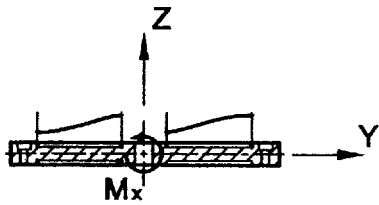
FIG. 9c            FIG. 9d
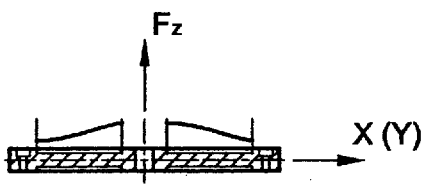
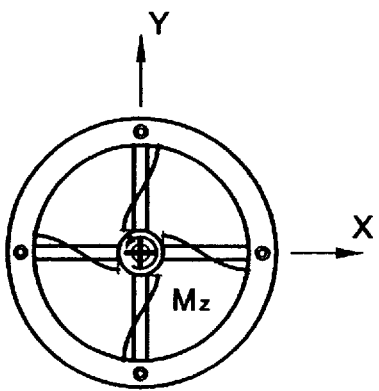
FIG. 9e            FIG. 9f

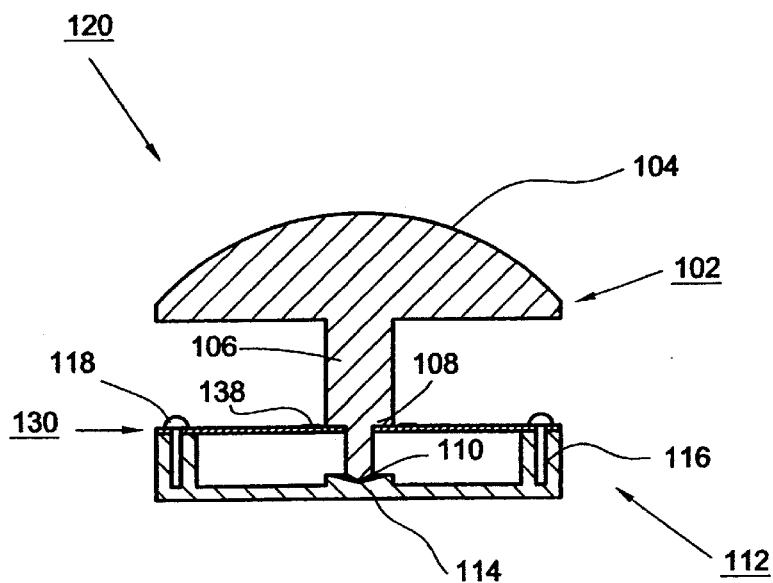
FIG. 13
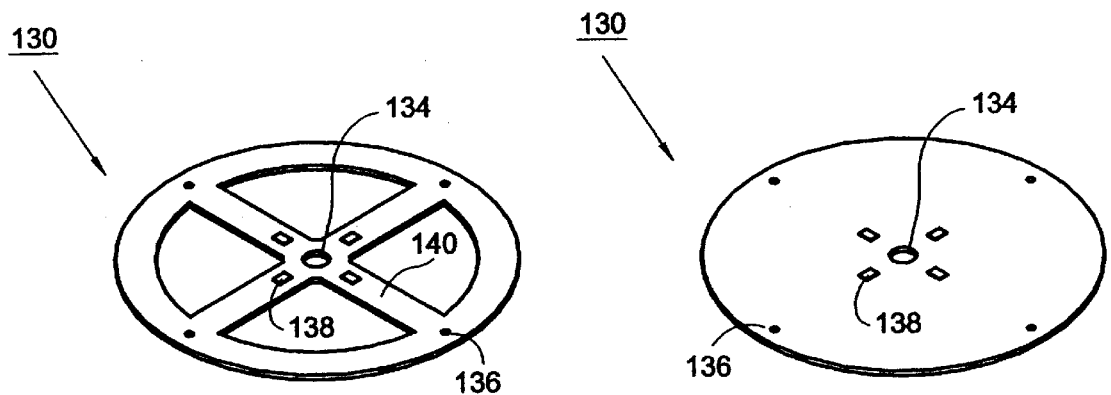
FIG. 14a                    FIG. 14b

METHOD OF TOUCH CONTROL OF AN INPUT DEVICE AND SUCH A DEVICE

FIELD OF THE INVENTION

This invention relates generally to the field of user interfaces for electronic devices such as computers and machine controllers. More specifically, the invention relates to touch sensitive user interfaces and methods for effecting movement control of, for example, a cursor on a computer screen or for directing object movement of a machine or robot.

BACKGROUND OF THE INVENTION

User manipulated devices are commonly used today in conjunction with electronic devices to control the movement of a pointer or cursor on a graphics screen or to directly control object movement of an apparatus such as a machine or robot. Some of these devices may be characterised as isotonic devices which map the user manipulation of the devices directly onto the object, such as a cursor. Some examples of isotonic devices are computer mice, trackballs, touch-pads and digitizer tablets. Other of these devices may be characterised as being isometric, meaning they relate the direction and magnitude of the force or torque applied by the user to the devices to the cursor or object movement. An example of an isometric device is a joystick.

Two fundamental operations with an input device such as a computer mouse are "pointing" and "dragging". In pointing the user manipulates the mouse to cause the cursor to move onto a target. In dragging the user moves an object into a target area. Human-computer interaction study shows that in general, the mouse movement is characterised by a large primary movement followed by smaller submovements. These movements correspond to gross positioning and then fine positioning of the object by the user manipulation of the mouse to align the object or cursor with the target.

The sensitivity of movement control or gain is the ratio between the distance the isotonic device must be moved to cause a given movement of the object such as a cursor on the display. This is also known as the Control-Display ratio between the resolution of the display, in terms of pixels and the resolution of the isotonic input device in terms of dots per inch (dpi).

In general, a high gain device is rapid in initial gross positioning but difficult to control when needing to make small precise movements. A low gain device allows small precise movement of the object and therefore easy (and quicker) fine positioning but is inefficiently slow at gross positioning. For a fixed gain input device, the trade-off between initial gross positioning versus final fine adjustment typically results in a U-shape gain-performance curve with best performance at a moderate gain level.

The demand on control sensitivity varies with the application. For general applications in graphical user interface (GUI), such as Windows by Mircosoft, the cursor is generally used to select medium sized icons on a medium resolution display and this is generally suitable to work with a fixed gain input device. On the other hand, often in CAD or graphic work a user has to select one target from very many, closely spaced, even pixel width target areas, such as an intersection of two lines. Such fine positioning can be very difficult with a device which has too high a gain and can be very stressful to the user. It is therefore desirable to have a low or moderate gain device for the fine control. However, the resolution of the display for CAD or graphic work is usually higher such that moving the cursor across a high-resolution display with a lower or moderate gain input device requires too much hand movement and can be tedious.

Several attempts have been made in the past to provide a more user friendly device. U.S. Pat. 4,963,858 to Chien discloses a mouse using accelerated motion switches to select predetermined gain. Another approach is taught in U.S. Pat. No. 5,793,354 to Kaplan. A separate gain control button or foot pedal is used to change the gain using an electronic circuit in response to the amount of depression of the button or pedal. Another version is taught in Canada Patent 2,203,387 to Even in which a variable transmission element is inserted between the rotating ball of the conventional mouse and the digitizing encoder system and activated by a lever. However, the use of a separated control button, or pedal, or lever, requires the user to coordinate the use of different limbs at the same time which is awkward and can be difficult to master.

A typical isometric joystick responds to a force exerted by the user's hand and is usually found embedded in the keyboard of a laptop or a notebook computer. The cursor moves in the tilting direction of the joystick and generally the cursor speed is determined by the force exerted. The same dilemma of gain to controllability applies to joysticks. Furthermore, it has been found that pointing times could be expected to be perhaps 20% slower than for a mouse performing the same tasks. Another concern is the "feel", or the lack of kinesthetic feedback because there is so little movement of the user's limb at the point of force application. For example, to slow down the user has to release pressure on the joystick by just the right amount. Too little, and the cursor stops short of its goal. Too much and the cursor shoots past. Again, this requires good hand eye coordination which can be difficult to master, tiring to use for any extended period and frustrating in practice.

Various attempts have been made to improve the kinesthetic response of the isometric joystick. U.S. Pat. No. 5,805,137 to Yasutake describes a 3D input controller and suggests that the speed of the cursor or object movement in a given direction will be responsive to the magnitude of the force applied to the corresponding force-sensitive pads. However, no structures or methods are taught as to how to ergonomically achieve this. Instead the disclosure teaches that determination of movement and force are two separate operations on a touchpad. The cursor response suffers a time delay from the application of a force due to computational requirements. The time lag between action and object response is disorienting and unacceptable.

U.S. Pat. No. 5,815,139 to Yoshikawa et al. describes a touch activated input device that teaches that the applied force on a force-sensitive touch pad can be used to vary the speed of movement of the object. The complication of using instantaneous force as a variable (which is computed and has an attendant lag) is simplified by dividing the forces into several levels and using a lookup table for a speed factor. However, the device is basically a joystick button on top of a touch pad and does not have the intuitive kinesthetic feedback of an isotonic device, because the operations are separate and thus still disjointed.

SUMMARY OF THE INVENTION

What is desired is a simple to use ergonomic device which permits cursor or object movement to be accomplished in a single operation of steering the pointer, at an appropriate speed range, including smooth acceleration and deceleration, by means of a touch control input method. Therefore, in one aspect, the present input device is a touch control device manipulated by the touch of the user that permits control of a computer or a machine. A human limb can send and receive information through both the force/torque and displacement/rotation. What is desired is user touch control that responds ergonomically, that is, in a manner more like a human limb responds. What is desired is to overcome the limitations of a single input control mode such as provided by the movement with the isotonic device only or as provided by the force with the isometric device. What is desired is a method and an apparatus to smoothly blend the two control modes, isotonic and isometric, together to compliment each other to improve the ease of use of the touch activated input control. It is therefore desirable to have an improved touch control input method and device that provides a user interface with kinesthetic and tactile feedback, that allows the user to vary the gain easily and smoothly, and a mechanically simple apparatus that overcomes the disadvantages of the prior art methods and devices discussed above.

Therefore, according to one aspect of the invention there is provided a method of touch control of a user input device, said method comprising the steps of:

providing a contact surface of known configuration mounted in a support and having a force sensing means operatively connected to said contact surface for sensing user contact with said contact surface;

contacting said contact surface to cause said sensing means to generate output signals corresponding to said contact;

using said output signals to provide a relative measure of a tangential force applied to said contact surface by said user contact; and using said relative measure of tangential force to control movement of an object in response to said user contact with said contact surface.

According to another aspect of the present invention there is provided an ergonomic touch control input device, said device comprising:

a manually manipulable member having a contact surface of known configuration;

a support in which said manipulable member is mounted; and a force sensing means operatively connected to said manipulable member for sensing user contact with said contact surface, said sensing means sensing a contact force at said contact surface other than a normal force and generating output signals related to said contact force for use in controlling an object's movement and for controlling the gain of such device to effect movement control, all in response to said user contact.

BRIEF DESCRIPTION OF THE DRAWINGS

Reference will now be made to the attached drawings which illustrate various embodiments of the present invention, by way of example only, and in which:

FIG. 2a is an illustration of a principle of a control method according to the present invention;

FIG. 2b is an illustration of a result of applying the control method according to the present invention;

FIG. 2c is an illustration of a result of applying the control method of the prior art;

FIGS. 9a–f are diagrammatic views of bending moments produced in the sensor of the first embodiment.

FIG. 13 is a sectional view of a third embodiment according to the present invention;

FIG. 14a is a perspective view of a sensor for the third embodiment;

FIG. 14b is a perspective view of an alternative sensor for the third embodiment;

DETAILED DESCRIPTION OF THE PREFERRED EMBODIMENTS

Figure 1:
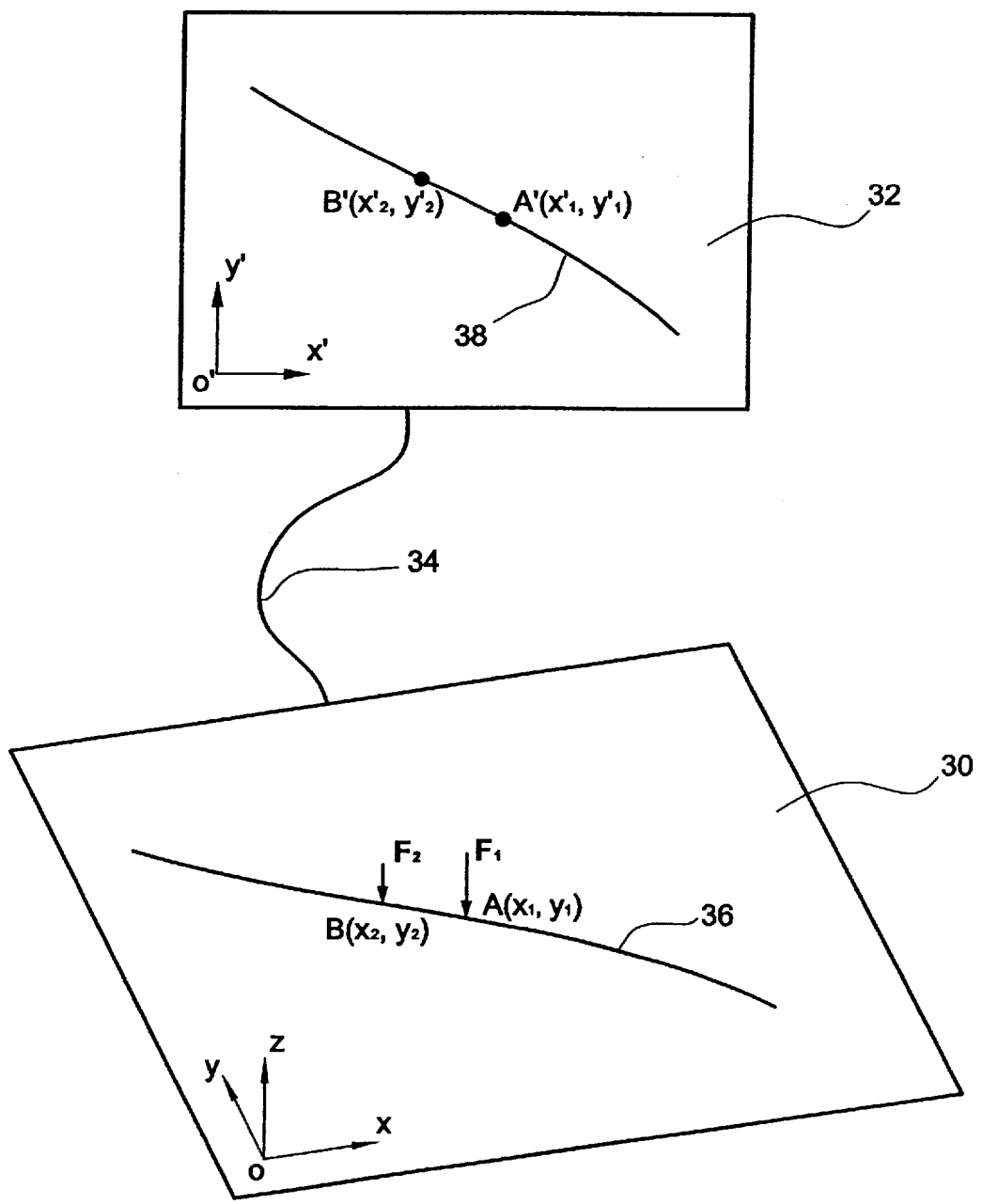
FIG. 1 is an illustration of the operating principle of a conventional isotonic input device.

FIG. 1 illustrates how a typical prior art isotonic input device operates. In FIG. 1, a user contact or control surface is identified as 30. The input device translates movement on the control surface 30 into movement of, for example a cursor or other object, on a computer display 32. Signals are transmitted via a link 34. As shown, user manipulated movement 36 on the control surface 30 is translated into the corresponding object movement 38 on computer display 42.

As will be understood by those skilled in the art, when a typical fixed gain device moves a distance $\Delta d$ input from a point A $(x_1, y_1)$ to a point B $(x_2, y_2)$, on the control surface 30 the cursor or object on the display 32 is caused to move a distance $\Delta do_{object}(=A'B')$ which is defined by the following transfer function:

$$\Delta d_{object} = G \Delta d_{input} = (G(x_2-x_1), G(y_2-y_1)).$$

where Δd means a change in distance and G means a constant corresponding to a specific amount of gain.

Thus, in a conventional device the gain is fixed. The user cannot change the speed of the object movement except by means of a separate switch or by changing the software to assign a new gain value to the transfer function as described above. In this sense, such conventional isotonic devices detect only a single user manipulable input variable which is the movement in the form of the distance the mouse is moved, or the change in contact positions with the touch pad. In general, these devices are not equipped to detect any contact force $F_1$ at a point $A(x_1, y_1)$ nor the contact force $F_2$ at a point $B (x_2, y_2)$ such as shown in FIG. 1. An aspect of the present invention is to use contact force as an element for control of the object movement through a touch control input device as explained in more detail below.

FIG. 2 illustrates a comparison between object movement according to the prior art and object movement according to the present invention. In FIG. 2a, the contact or control surface 30 is shown with contact movement by a user between points A, B and C. As can be noted, the contact point is moved a short distance between A and B and a longer distance between B and C. A constant force $F_{ab}$ is applied between points A and B and a constant force $F_{bc}$ is applied between B and C.

FIG. 2c illustrates the translation of the user manipulated input movement of an object on a computer display 32 according to the prior art. Essentially, because a typical mouse is only concerned with translating movement, the object movement mirrors the user manipulated input movement and has a short leg A"B" and a longer B"C".

FIG. 2b illustrates the desired object movement according to an aspect of the present invention. In the present invention, the user contact force is measured, and used to, for example, vary the gain which governs the degree of object movement translated from the user contact with the control surface. In FIG. 2b a variable gain G is designed to respond directly in proportion to the magnitude of the applied force F. In other words G=G(F)=kF where k is a transfer function provided by the hardware that relates output control signals to the force applied. This hardware transfer function k may be considered to be a constant in this example. In practice, the hardware transfer function k may also be varied by other control factors to further improve the ergonomics. Thus, the object movement on screen 32 as illustrated in FIG. 2b is given by the relationship:

$$A'B'=G(F)AB=kF_{ab}AB$$

$$B'C'=G(F)BC=kF_{bc}BC$$

Thus, according to the present invention a small movement AB modified by a higher force $F_{ab}$ produces a larger gross positioning displacement of the object on the computer screen 32 along A'B'. Conversely, a lighter force $F_{bc}$ allows greater movement BC of the input device that is easier to control and more manoeuvrable for fine positioning of the cursor or the object along B'C' which is conversely smaller. Thus, FIG. 2 illustrates a preferred implementation of the present invention in which the gain, or sensitivity of control, varies according to the user manipulation of the input device. In this manner, more forceful touching is associated with larger gross movements while a soft touch is associated with smaller finer positioning.

It will also be appreciated that the contact force F is often applied by the user by the placement of a finger on the control surface. This touch provides a tactile feedback to the user, which along with the kinesthetic feedback from the movement of the control surface facilitates manipulation of the object. In human-computer interaction terms the kinesthetic feedback of the movement trajectory over the control surface provides a first mode or channel for feedback control and the tactile touch corresponding to the contact force on the control surface provides a second mode or channel of feedback control that is independent from the first. It can now be appreciated therefore that the second mode of input, namely, the applied force, can be used to greatly enhance the control and manoeuvrability of object movement through the touch control input device. Thus, according to the present invention, the touch control causes the object to respond in a natural and intuitive manner like in the physical world in that a force is applied to an object to accelerate or decelerate the object's movement and to steer the movement trajectory. The present invention further comprehends an input structure to provide an ergonomically intuitive input device. This structure is described in more detail below.

During actual use, the applied force F will typically vary along the path of the user manipulated movement 36. To use a conventional touch pad for example, it would be necessary to monitor the instantaneous change of position ($\Delta d_{input}$) at the same time as monitoring the instantaneously applied force F in order to compute and direct the corresponding object movement $\Delta d_{object}$. Thus, the force $F_1$ at any given starting position of the control movement 36 may be different from the force of two at any given ending position of the incremental movement. To work, this would require implementing some form of decision rule to determine which of the force parameters, $F_1$ and $F_2$ would apply to the variable gain function and over what time frame. This is complicated, time intensive, awkward and difficult to implement in an ergonomic manner.

Figure 3A:
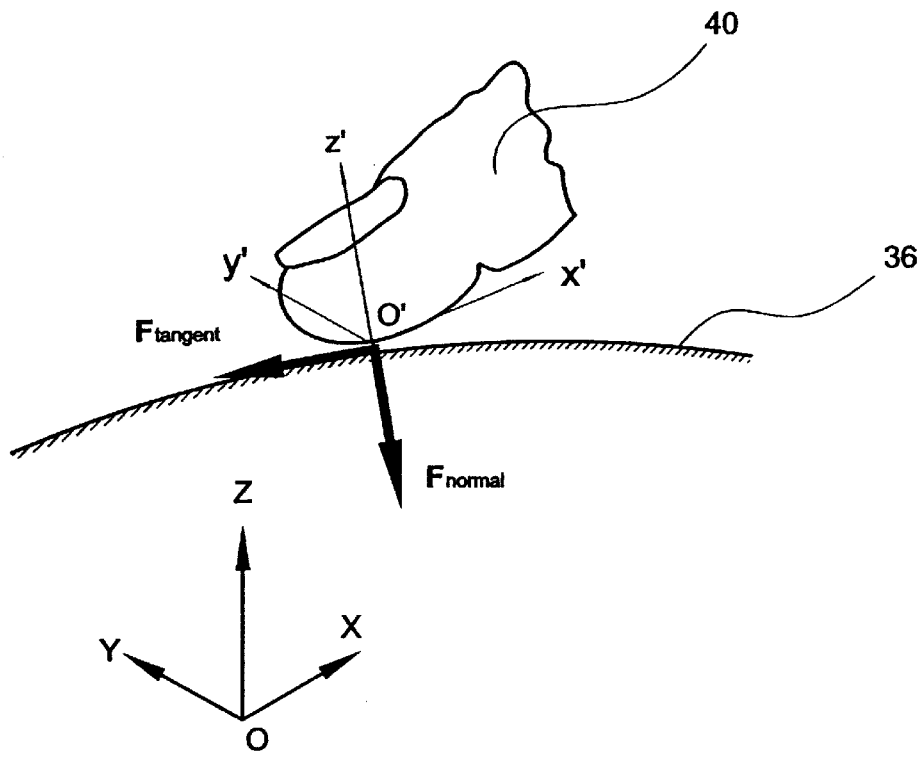
FIG. 3a is an illustration of a normal force and a tangential force component at the point of contact of a touch control input device.
Figure 3B:
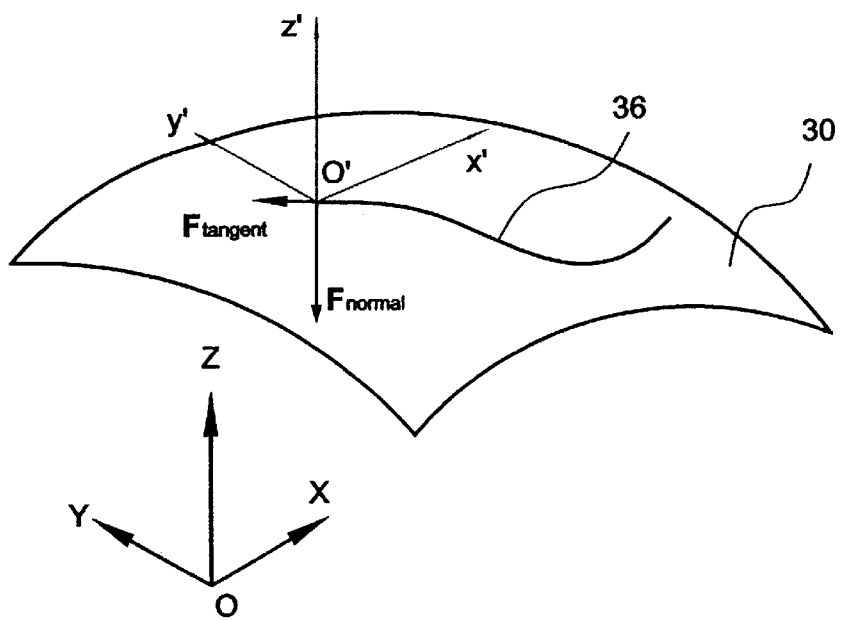
FIG. 3b is an illustration of a tangential force which is representative of motion on a 3D surface according to the present invention.

The present invention overcomes this problem by simplifying the integration of the isotonic and isometric control modes most preferably into an integrated touch sensitive element. This is illustrated in FIGS. 3a and 3b, in which a finger 40 is shown moving on a user manipulable touch sensitive contact or control surface 30. The surface 30 is of known configuration such as a curved 3D surface, and for illustration only is shown as part spherical. In this manner, a tangential force $F_{tangent}$ of a sliding contact bears a fixed relationship to the normal force $F_{normal}$ as determined by the coefficient of friction $\mu$ of the contacting surfaces, where $F_{tangent}=\mu F_{normal}$. Hence, the tangential component $F_{tangent}$ of the contact force F is representative of both the tactile feel in magnitude and in direction for the motion of an object. In this manner, it will be appreciated that the tangential force $F_{tangent}$ is always coincident with the direction of the instantaneous movement $\Delta d_{input}$ as shown in FIG. 3b.

Therefore, according to the present invention, the object movement $\Delta d_{object}$ can be expressed as a function of the tangential force $F_{tangent}$. By determining the instantaneous tangential force $F_{tangent}$ of user contact on the control surface, the object movement can be directed to follow the contact trajectory and the object speed can be varied according to the applied and measured tangential force. In turn the applied force can be instantly and easily controlled by the user.

It can now be appreciated therefore that the user contact pressure on a surface of known configuration can, according to the present invention, provide speed control and directional control in a single ergonomically efficient touch control input device. In this sense, ergonomically efficient means that the user manipulation is intuitive, namely, the more force that is applied to the control surface, the faster the corresponding movement of the object or the cursor on the computer screen. Thus, a lighter touch on the control surface reduces the speed of movement of the object or the cursor on the computer screen. Moreover, gross positioning can be achieved by a relatively small user movement with a forceful contact and fine positioning by a relatively large movement with a light touch. It can now be appreciated, that the tangential force, when measured, can be used to vary the response sensitivity of the input device in real time as a function of the user contact or touching of the input device.

In the physical world object movement in response to an applied force is also related to the mass of the object—the heavier the object the slower the acceleration. Similarly the tactile feedback of the touch control input method according to the present invention can be further improved by introducing a virtual mass to the object. The hardware transfer function k that convert the force to output signals may be altered by an assigned value according to the property of the selected object representing a virtual mass of the object in the user interface. The object movement is then responsive to the applied contact force to the control surface as if there is a mass associated with the object. Hence, a larger force would be required to move an object to which a higher virtual mass value is assigned. This interactive gain control is particularly useful or differentiation when several objects are being manipulated.

What remains however is to provide a user manipulable control surface that permits measurement of the user contact force in this manner. It will be appreciated by those skilled in the art that any surface with a known configuration that can be represented mathematically could be instrumented to achieve the objects of the present invention. In essence, the general principle is that one needs to determine the contact force, and implement an object movement control according to the tangential component of the contact force. However, a further aspect of the present invention is to provide an easy to use and efficient configuration for the control surface that facilitates the computation and thus the implementation of the control of object movement as desired.

Figure 4:
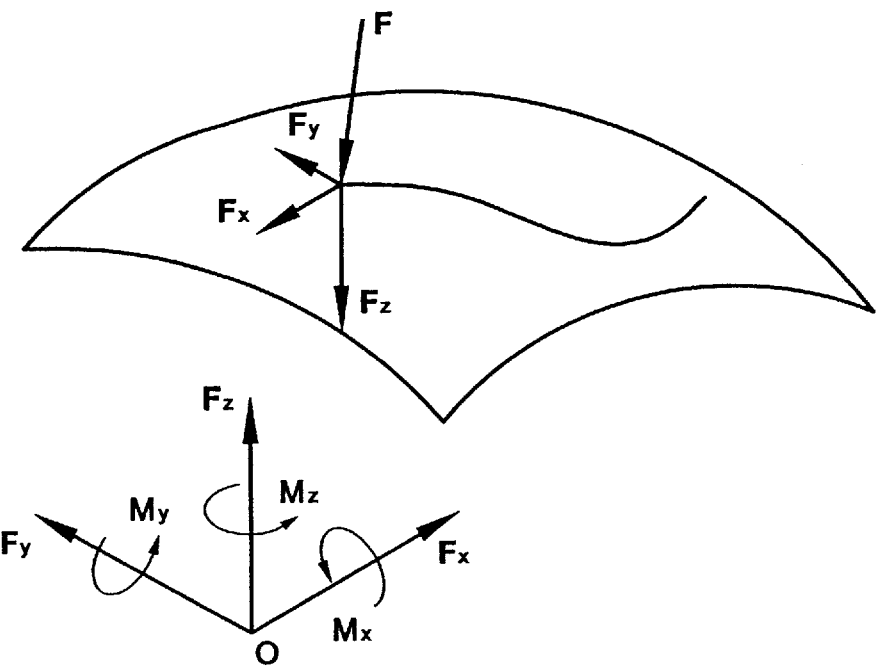
FIG. 4 is an illustration of point of contact force components represented in a Cartesian coordinate system for describing a system of force measurement.
Figure 5:
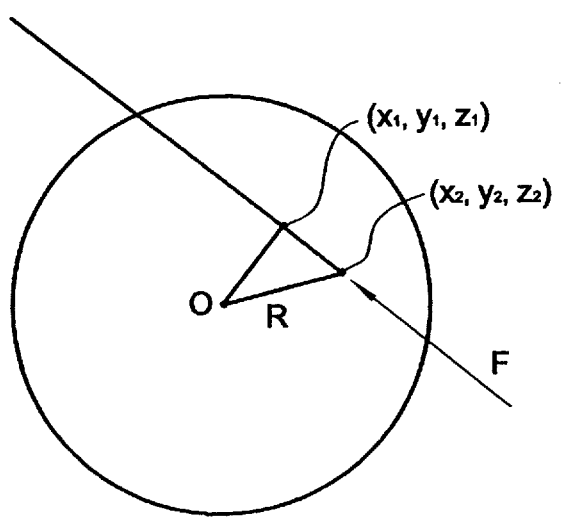
FIG. 5 is an illustration of a point force exerted on a spherical surface for describing a system of force measurement.

Although any surface with known configuration that can be represented mathematically can be used, some are preferred to others because of ease of computation. The general principle to determine the contact force is set out below. Reference is made to FIGS. 4 and 5 of the drawings. For this example, the control surface on the user manipulable body is shown as part spherical for illustration. A point force F exerted on a frictional surface can be resolved into component ($F_x$, $F_y$, $F_z$) along the x, y, and z-axis. The contact force F exerted on the user-manipulable body through a point contact on the exterior control surface will cause the following system of forces and moments at the center of the sphere:

$$a_1 = F_x$$

$$a_2 = F_y$$

$$a_3 = F_z$$

$$a_4 = M_x = y_1 F_z - z_1 F_y$$

$$a_5 = M_y = z_1 F_x - x_1 F_z$$

$$a_6 = M_z = x_1 F_y - y_1 F_x$$

where ($x_1$, $y_1$, $z_1$) are the components of a vector perpendicular to a line of action of the force from the origin of the sensing system to the line of action of the force. Using the above equation the point ($x_1$, $y_1$, $z_1$) can be determined. The location of contact can now be determined by geometry. The line of action passes through the point ($x_1$, $y_1$, $z_1$) and through the surface of the sphere. The coordinates of an arbitrary point along the force's line action will be, $$d_1 = x_1 + nF_x/F$$

$$d_2 = y_1 + nF_y/F$$

$$d_3 = z_1 + nF_z/F$$

where F is the magnitude of the force, $\sqrt{(a_1^2 + a_2^2 + a_3^2)}$ and n is any arbitrary number. The point ($x_2$, $y_2$, $z_2$) lies on the surface of the sphere, defined by $x^2 + y^2 + z^2 = R^2$. If the point ($x_1$, $y_1$, $z_1$), lies within the sphere, $x^2 + y^2 + z^2 < R^2$, then the line of action of intersects the sphere at two points. The coordinates of the points ($x_2$, $y_2$, $z_2$) are found by substituting the equation of the line of action into the equation of the sphere, $d_1^2 + d_2^2 + d_3^2 = R^2$. Solving for the unknown variable n and substituting back into the equation will give the two points of intersection. If the force is assumed to be exerted into the sphere, not pulling on it, one of the points can be eliminated. The remaining points will be the coordinates of $x_2$, $y_2$, $z_2$.

Thus, by detecting the forces and moments acting upon the body of the control surface of known configuration, the location, magnitude, and direction of a force exerted through a point contact can all be determined. The tangential force $F_{tangent}$ can be derived using geometric transformation.

Thus, the present invention provides a mechanically simple force sensing apparatus which can be constructed to provide an output corresponding to the tangential force $F_{tangent}$, which can be used to simultaneously control the speed, direction of movement and sensitivity of response or gain. It will also be appreciated that the actual contact force can be measured in any plane other than normal to the surface, from which the tangential force $F_{tangent}$ may be derived. Thus while the various embodiments below measure directly a tangential force $F_{tangent}$, all that is necessary is to measure a force with a tangential component (i.e. anything other than a normal force) and to resolve for the tangential force $F_{tangent}$.

Figure 6:
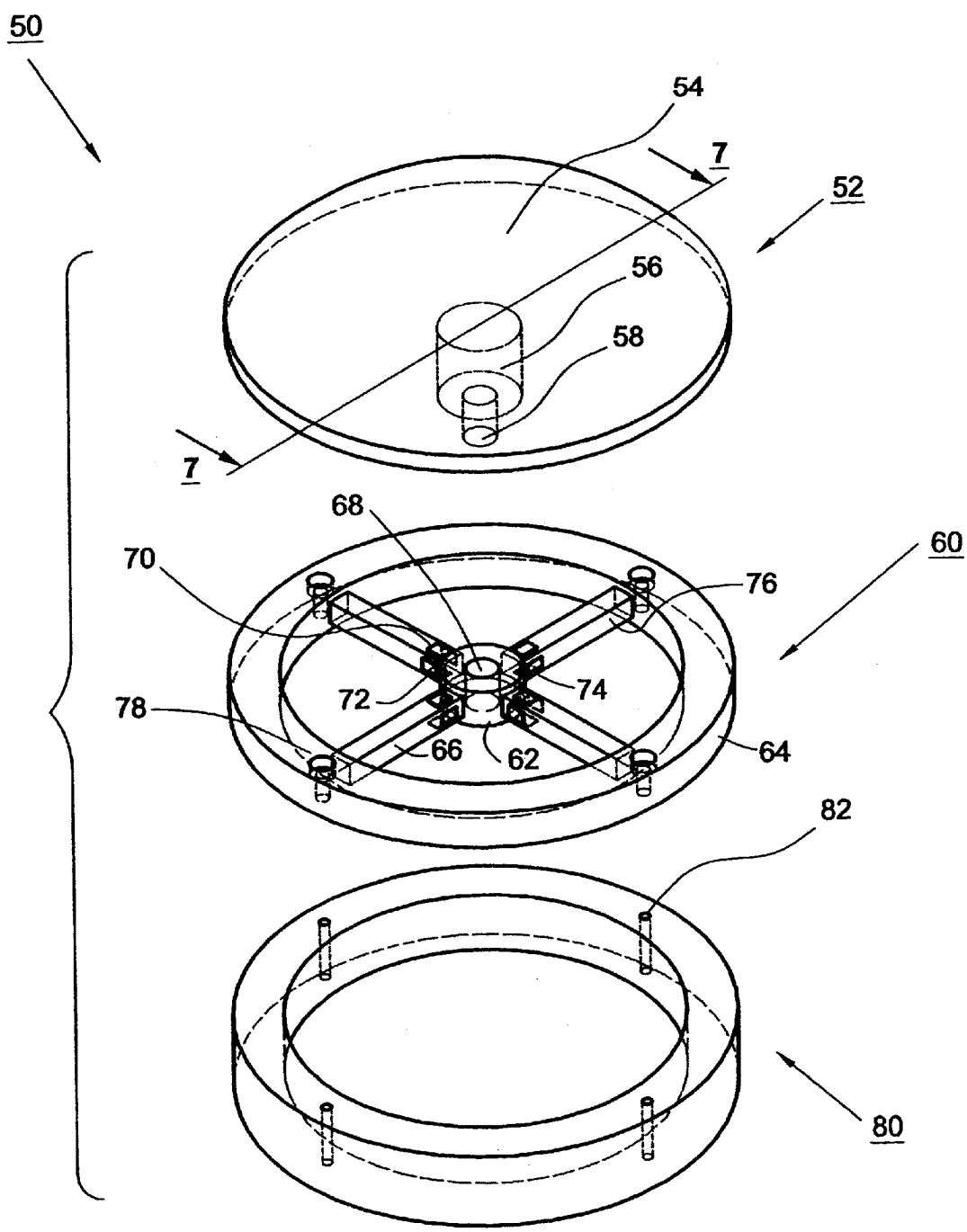
FIG. 6 is an exploded view of a first embodiment of the present invention.
Figure 7:
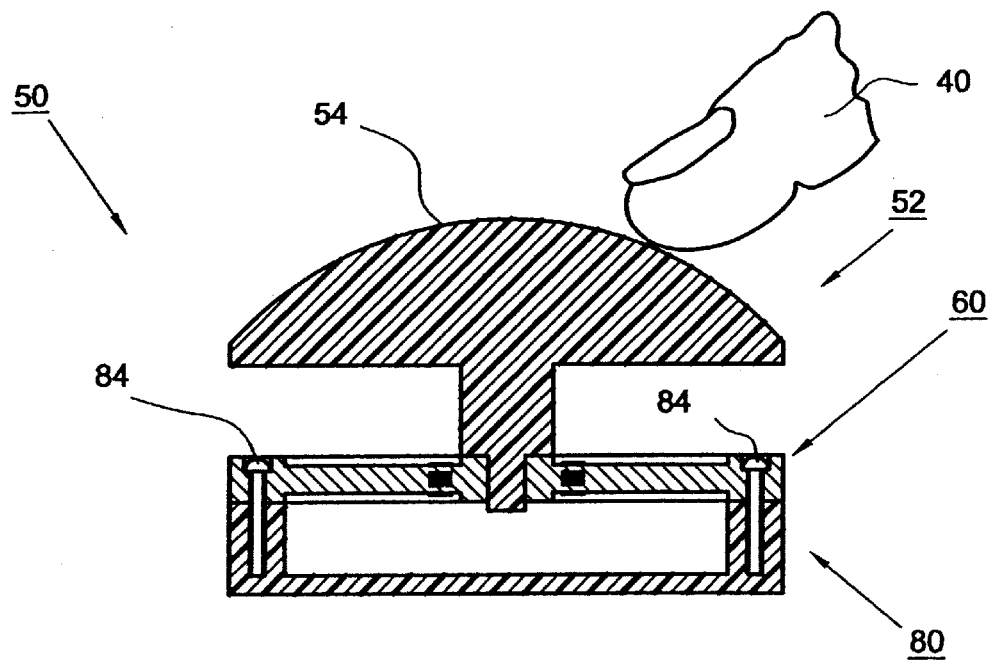
FIG. 7 is a sectional view of the first embodiment of FIG. 6 along line 7—7.
Figure 8:
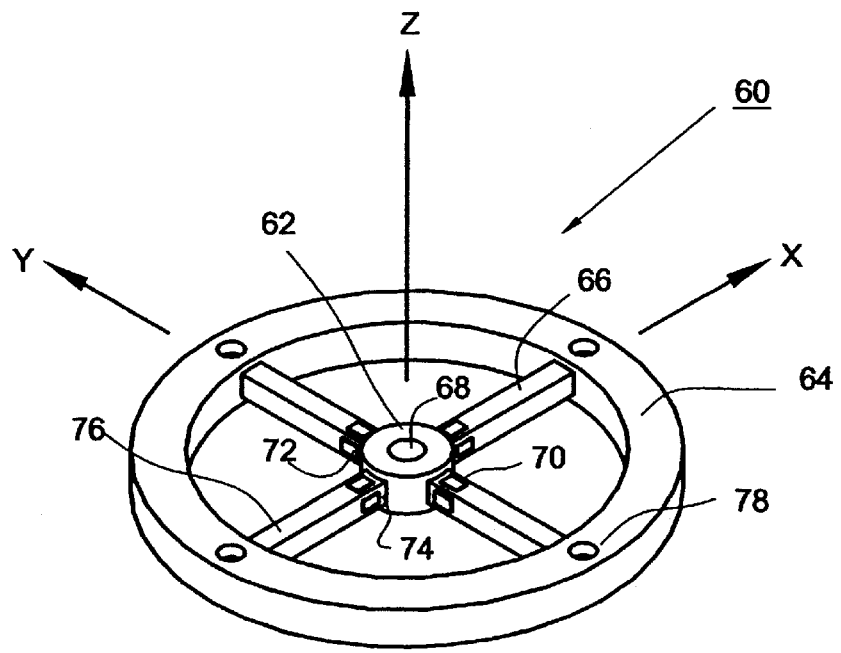
FIG. 8 is a perspective view of the force sensor of FIG. 6.

A first embodiment of an input device that was designed to perform in accordance with the touch control input method explained above will now be described with reference to FIG. 6 through 11. An exploded view of the first embodiment is shown in FIG. 6. The input apparatus 50 generally includes a user-manipulable movable member 52, a force transducer or a force transfer member 60 and a support 80. FIG. 7 shows a sectional view and FIG. 8 shows the perspective view of the force transfer member 60. The movable member 52 comprises an exterior contact surface 54 of known configuration which means that it can be defined mathematically. The contact surface provides a physical contact with a user's finger 40, FIG. 7, or a stylus (not shown). For purpose of illustration the contact surface 54 is shown as part spherical. The user-manipulable member 52 includes a column 56 extending from the interior and a shouldered end 58 of the column 56 is fixed to a centre hub 62 of the force transfer member 60.

In the embodiment, the force transfer member 60 is preferably in the shape of an integral spoked wheel which includes a rigid centre hub 62 and a rigid outer rim 64 connected by at least three, but most preferably four, spokes 66 disposed in a plane perpendicular to the central axis of the wheel (see FIG. 8). The shouldered end 58 from the user-manipulable member 52 is mounted within a centre hole 68 at the center hub 62 of the force transfer member 60. It may be mechanically secured by being tight-fitting, by welding or other securing means. Any form of mounting is acceptable provided that the user contact force on the contact surface 54 can be transmitted to the spokes 66 of the force transfer member 60. Also, as shown in FIG. 7, the outer rim of the spoke wheel is provided with a plurality of holes 78 so that the force transfer member 60 can be fixed to a support 80 by means of screws 84, glue or other securing means.

The spoked wheel 60 is preferably made of a resilient material such as a metal or a polymer sized and shaped so that the spokes 66 will flex in response to a force applied on the contact surface of the user-manipulable member 52. A plurality of force sensors or stain gauges 70 are preferably mounted on the spoke surfaces at the inner end section 74 of the spokes 66 close to centre hub 62. Most preferably the strain gauges 70 are provided in pairs, on all opposed surfaces of the spokes and are disposed in planes perpendicular to the central axis of the wheel 60. Another set of strain gauges 72 are mounted on the end section 74 of the spokes 66 close to centre hub 62, in each case in pairs, on all opposed surfaces of the spokes disposed in planes extending parallel to the central axis of the wheel. Another preferred location for the placement of the strain gauges is the outer end section 76 of the spokes 66 close to the outer rim 64. Thus there are two pairs or four strain gauges per spoke for a total of sixteen gauges for the preferred four spoke wheel 60. In a more simplified version of this embodiment, two gauges per spoke could be used. It will be appreciated by those skilled in the art that the force sensing can be done with strain gauges as shown, but that there are many types of forces sensors which may be used with equal effect, such as capacitive or resistive force sensing devices, such as wire gauges, piezoelectric gauges, thin film or thick film force sensing resistors or any other means that generates a signal in response to the strain or force changes.

Once signals are produced as output from the gauges, they are fed through an A/D converter to a microcontroller, not shown, or a single microcontroller having A/D functions, not shown, which computes the location, magnitude and direction of the contact force F. FIGS. 9a through 9f illustrate the bending moment in each of the spokes in schematic diagrams. These bending moments produce strain on the surfaces of the spokes. As will be appreciated by those skilled in the art, the location of the contact point and the contact force F can be derived from the sum and differences of strains measured through use of the equations set out above. The tangential force component $F_{tangent}$ is then obtained by geometric transformation.

Figure 10:
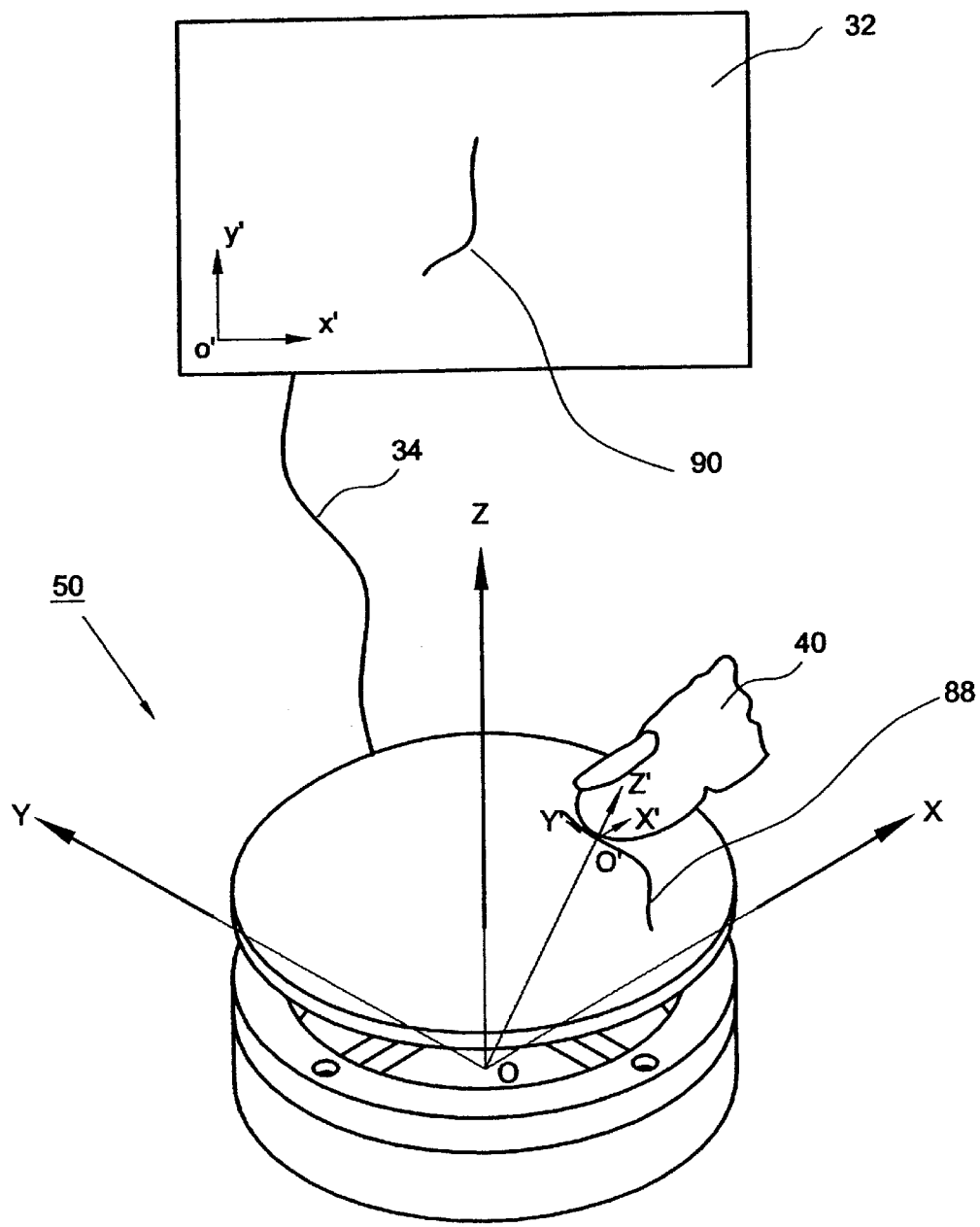
FIG. 10 shows the method of use of the first embodiment for 2D applications.

FIG. 10 is a diagrammatic illustration of a 2D application of the present invention. If the contact surface 54 is a planar surface, the operation is similar in that a tangential component of any applied force can be used to vary the gain of the input transfer. If the contact surface 54 is a 3D surface, the user maps the movement 88 on an imaginary plane projected from the x-y plane of the apparatus. The user may perceive the normal of the contact surface at the point of contact of the finger 40 with the contact surface 54 as the z'-axis and x'-y' plane tangential to the control surface 54 at the point of contact, FIG. 10. The axis O'x' is parallel to the Ox axis of the input device 50, and axis O'y' is parallel to the device axis Oy. The corresponding object movement 90 is illustrated schematically on the display 32, FIG. 10.

Figure 11:
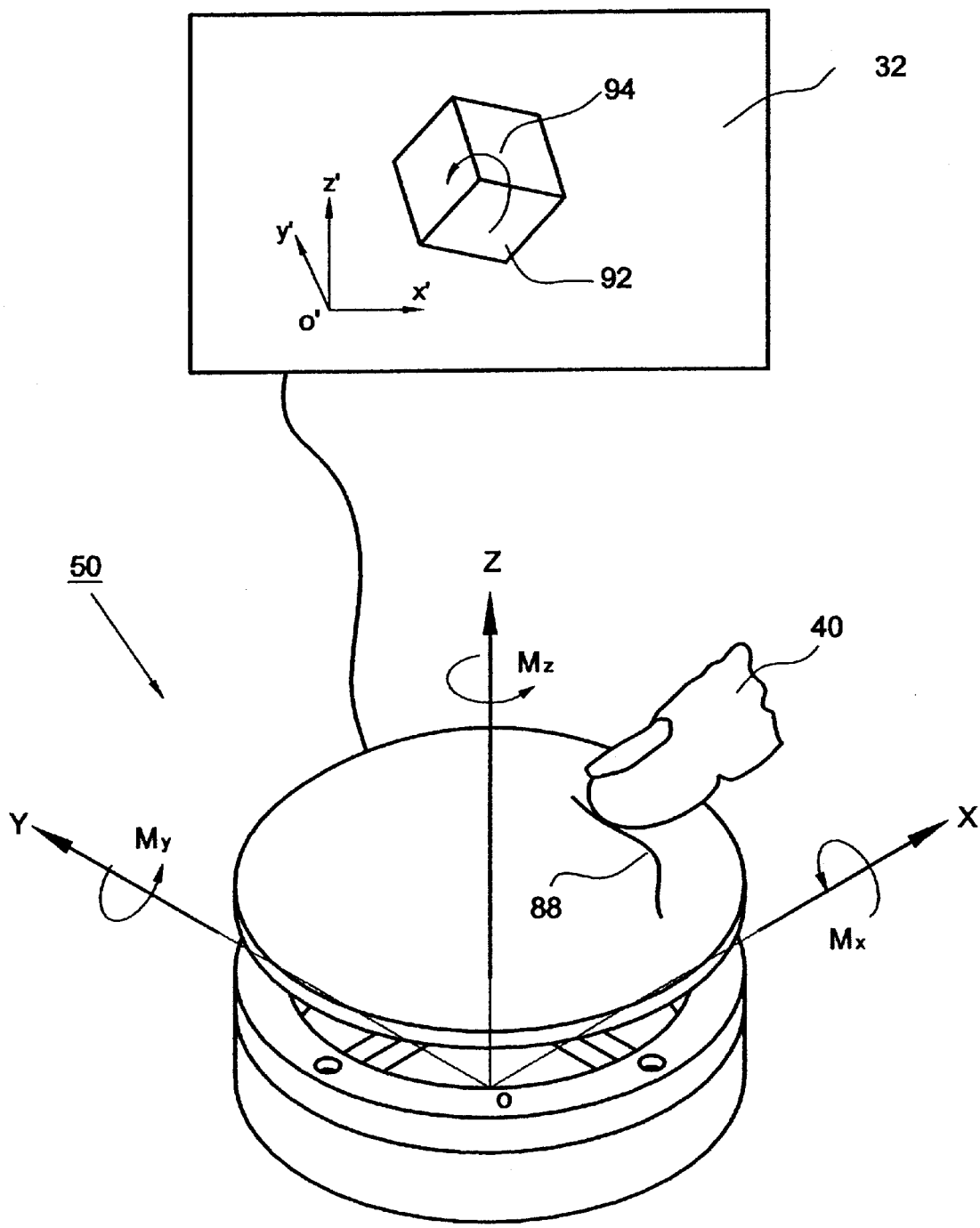
FIG. 11 shows the method of use of the first embodiment for 3D applications.

The present invention can also be used for rotational control in 3D applications. This is illustrated in FIG. 11. The input movement 88 produces a rolling, pitching and yawing motion to a 3D object 92 about the apparatus' frame of reference Oxyz, FIG. 13. The result is a 3D rotation 94 of the 3D object 92 about its corresponding reference frame O'x'y'z' as shown schematically on the display 32, FIG. 11.

A further aspect of the present invention is to use a switch or a select button (not shown) to switch between 2D translation and 3D rotation modes for an overall control of a spatial movement of an object.

The known configuration of the contact surface as described in the first embodiment is a general construction that may be shaped to suit any specific application, or it may be shaped to simplify the mathematical computation required to derive the tangential force $F_{tangent}$ from the strain gauge signals. In the preferred embodiment the force normal to a spherical surface will pass through its center and will not produce any moment on the body about the center. The force tangential to the spherical surface produces moment about the center equal to the force times the radius of the sphere. In the preferred spherical or part spherical embodiment the computation requirement is very manageable. By constructing a device that detects the moment acting on the part spherical body alone (i.e. about or relative to its centre), the tangential force can be obtained directly from the strain gauge signals, eliminating calculation steps and enhancing the response time of the input control apparatus.

It will now be appreciated that the present invention in its most preferred form provides for the use of a contact surface of known configuration, which is supported in a support structure. Associated with the contact surface is a force sensing means to produce a measured output. It will be appreciated that it has been found convenient to provide the force sensing means in the support structure, but that such sensing means can be located anywhere that permits it to be operatively connected to said contact surface to provide the desired output signals as explained herein. By forming the contact surface in a part spherical shape, the output can be used to directly control an object or cursor's movement, and, by utilising the force measurement to instantaneously control gain, the response sensitivity can be intuitively varied by the user merely through varying touch on the contact surface. A number of different support configurations can be used, as well as different sensing or instrumentation elements and devices. What is preferred though is to provide an instrumented support structure which is responsive to loads placed on the contact surface and which measures directly a tangential component of force of the user contact. Some other embodiments will now be discussed.

Figure 12:
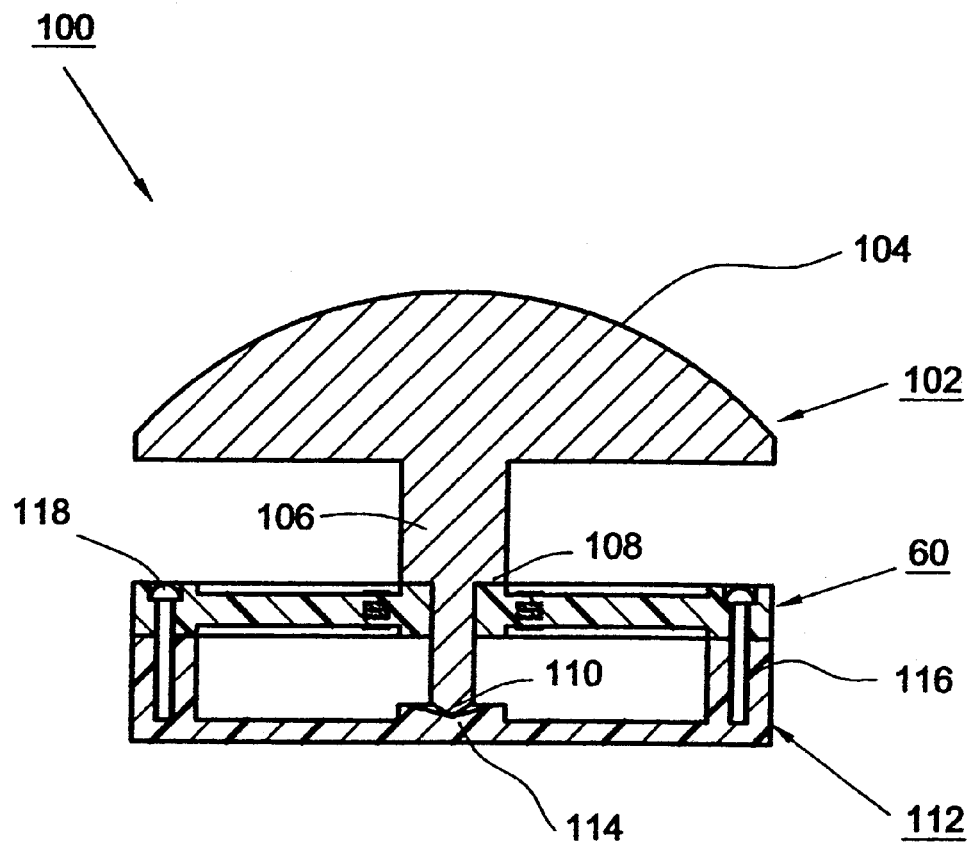
FIG. 12 is a sectional view of a second embodiment according to the present invention.

FIG. 12 is an illustration of a touch control input device in accordance with a second embodiment of the present invention shown in a cross sectional view. Input apparatus 100 generally includes a user-manipulable movable member 102, the same force transfer member 60 as in the first embodiment, and a support 112. The user-manipulable member 102 comprises a convex spherical exterior contact surface 104. The contact surface 104 provides a frictional contact for a user's finger or a stylus (not shown). The user-manipulable member 102 includes a column 106 extending from the interior and a bevelled end 110 of the column 106 pointed at the center of curvature of the spherical contact surface 104. A stepped section of the column 108 is placed in the center hole 68 at the centre hub 62 of the force transfer member 60 and is secured by interference fit, welding or other securing means so that the user contact force on the contact surface 104 can be transmitted to spokes 66 of the force transfer member 60. The force transfer member 60 is attached to a support 112 that may include mounting holes 116 and may be attached by means of screws 118 or other securing means. The supporting member 112 also includes a bevelled area 114 below the bevelled end 108 such that the user-manipulable member 102 can be movable around the center of curvature of the spherical contact surface 104 with the pointed end 110 as the fulcrum. The advantage of this embodiment is that the supporting member 112 supports the member 102 to act as a form of over strain protector, but still allows the member 102 to be movable about the center point of the part spherical contact surface 104.

The normal component $F_{normal}$ of the contact force on the spherical contact surface 104 will not produce any effect on the strain gauges because it is balanced by a reaction force at the pivot 108. The tangential force $F_{tangent}$ produces moments $M_x$, $M_y$ and $M_z$ about the x, y and z-axis with origin at the pivot point 108. The bending moments and hence the strains detected in the spokes 66 of the force transfer member 60 are then direct measurements of the components of the tangential force $F_{tangent}$ along these axes, FIG. 9. This simplifies the computation as is in the case of the first embodiment to obtain the tangential force $F_{tangent}$. In 3D rotational control, a minimum of three strain gauges will suffice although six gauges are preferred for a bridge circuit. In 2D applications, a minimum of two stain gauges are needed but preferably four will be used. The gauges can be connected to form an arm of a Wheatstone bridge in a known manner.

While a spherical contact surface reduces the computation, the mechanical construction of the force transfer member for 2D applications may be simplified to reduce the manufacturing cost, since only two directional variables, x and y, are required. An alternative embodiment of a touch control input device 120 for 2D applications that was designed in accordance with another embodiment of the present invention is illustrated in FIG. 13 shown in a cross sectional view. The input device 120 is a variation of the second embodiment 100 and generally includes the user-manipulable movable member 102 and the support 112 of the second embodiment 100, and a planar force transfer member 130 which is formed from a planar substrate.

The stepped shoulder 108 of the column 106 is attached in a centre hole 134 of the substrate 130 and is secured by force-fitting, welding or other securing means so that the user contact force on the contact surface 104 can be transmitted to the substrate 130. The substrate 130 is fixed to the support 102 so that the pointed end of the column 106 is seated on the bevelled support area 114 at the centre of the support 102. The substrate 130 also includes a plurality of mounting holes 136 such that the substrate 130 can be secured to the support 102 by means of screws 118 or other securing means. The user-manipulable member 102 can be movable around the pointed end 110 of the column 106 that is also the center of curvature of the convex spherical contact surface 104. Whether 2D or 3D, the size of the measured force will still be used to control the response sensitivity of the device to touch.

As shown in FIG. 14, the force transfer member 130 is made of a thin resilient plate and has a generally circular or disk shape. The substrate 130 may be made of a metal plate, ceramic, silicon crystal or resin materials. The substrate 130 can be notched to provide flexible crossed arms 140 as illustrated in FIG. 14a or in the form of one flat disk as shown in FIG. 14b. A plurality of strain gauges 138 or force sensors, preferably four, are placed on one side of the substrate 130. The force transfer member 130 in the form of planar substrate would make it easier to deposit a thin film or thick film strain gauges on its surface. The strain gauges 138 detect the motion of the user-manipulable member 102. The operation is similar to that of the second preferred embodiment wherein the tangential force $F_{tangent}$ of contact can be directly measured by the strain gauges.

It will be apparent to those skilled in the art that the configuration of the planar force-sensing substrate is not limited to a cross-shape nor a disk plate, and that various modifications or alterations may be made without departing from the scope of the present invention provided that output signals are generated which are related to the force applied to the touch control input device.

Figure 15:
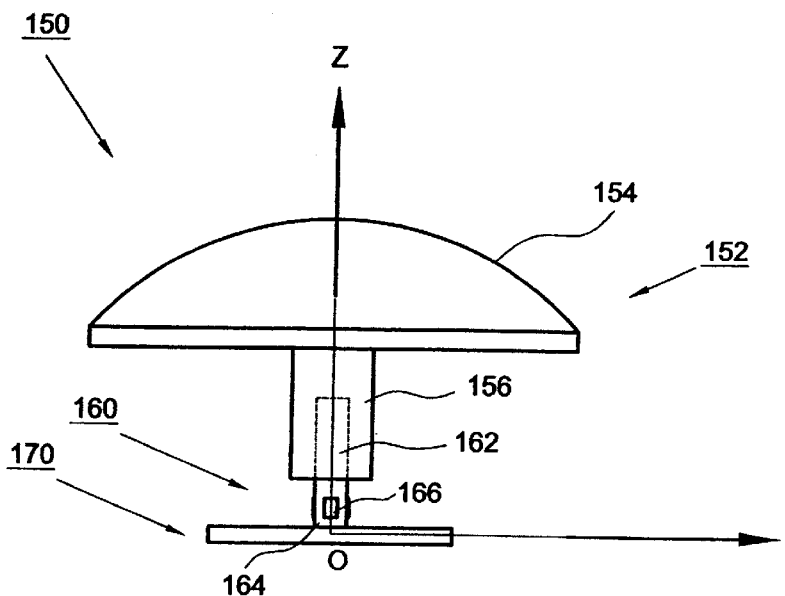
FIG. 15 is a side view of a fourth embodiment according to the present invention.
Figure 16:
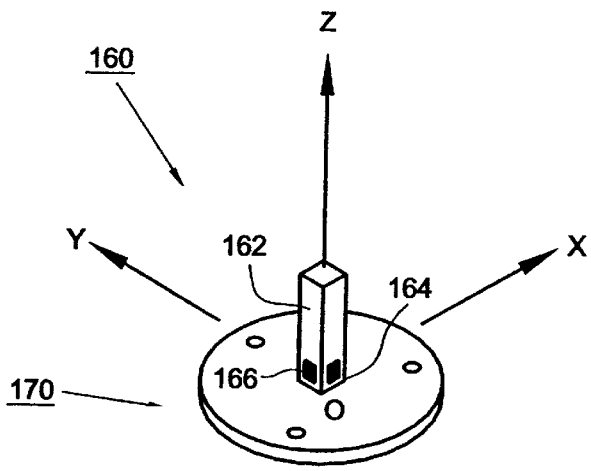
FIG. 16 is a perspective view of a sensor element used in the fourth embodiment according to the present invention.

FIG. 15 is an illustration of another touch control input device 150 for 2D applications in accordance with another embodiment of the present invention. The input device 150 generally includes a user-manipulable member 152, a force transfer member 160 in the general shape of a columnar force stick of which one end 164 is supported within a central portion of a support 170. Four strain gauges 166 are fixed to the four side faces of the columnar body 162 near the fixed end 164. A perspective view of the force stick 160 on the support 170 is shown in FIG. 16.

The user-manipulable member 152 comprises generally a convex spherical exterior contact surface 154. The contact surface provides a frictional contact with a user's finger or a stylus (not shown). A hollow column 156 extends from the interior into the columnar body 160 so that the center of curvature of the convex spherical control surface 154 coincides with the fixed end 164 of the columnar force stick 160. Thus, the support 170 and the columnar body of the force stick 160 can flex about the center of curvature of the contact surface 154 in response to force applied on the user-manipulable member.

In operation the line of action of a normal force $F_{normal}$ on the spherical contact surface 154 passes through the center which is also the fixed end of the force stick 160 and therefore produces negligible effect on the strain gauges 166. In this manner, the output signals from the strain gauges 166 are directly proportionally to the tangential force $F_{tangent}$.

The strain gauge or force sensors can be any conventional resistive or capacitive strain gauges, thin film or thick film force sensing resistors, or the like. The columnar body 160 can be either rectangular or circular in cross section. The circular cross section responds uniformly in all directions while the rectangular cross section may exhibit some non-uniformity in output signals in response to forces from different directions due to the variation of the bending properties in different directions. However, this effect may be minimized by offsetting the orientation of the flexible force transmitting member from the user's spatial axis.

Adequate results may be obtained by using force transducers of the columnar body plus support type as are commercially available as series 105 Thick Film Pointing Device by CTS Corporation.

Figure 17:
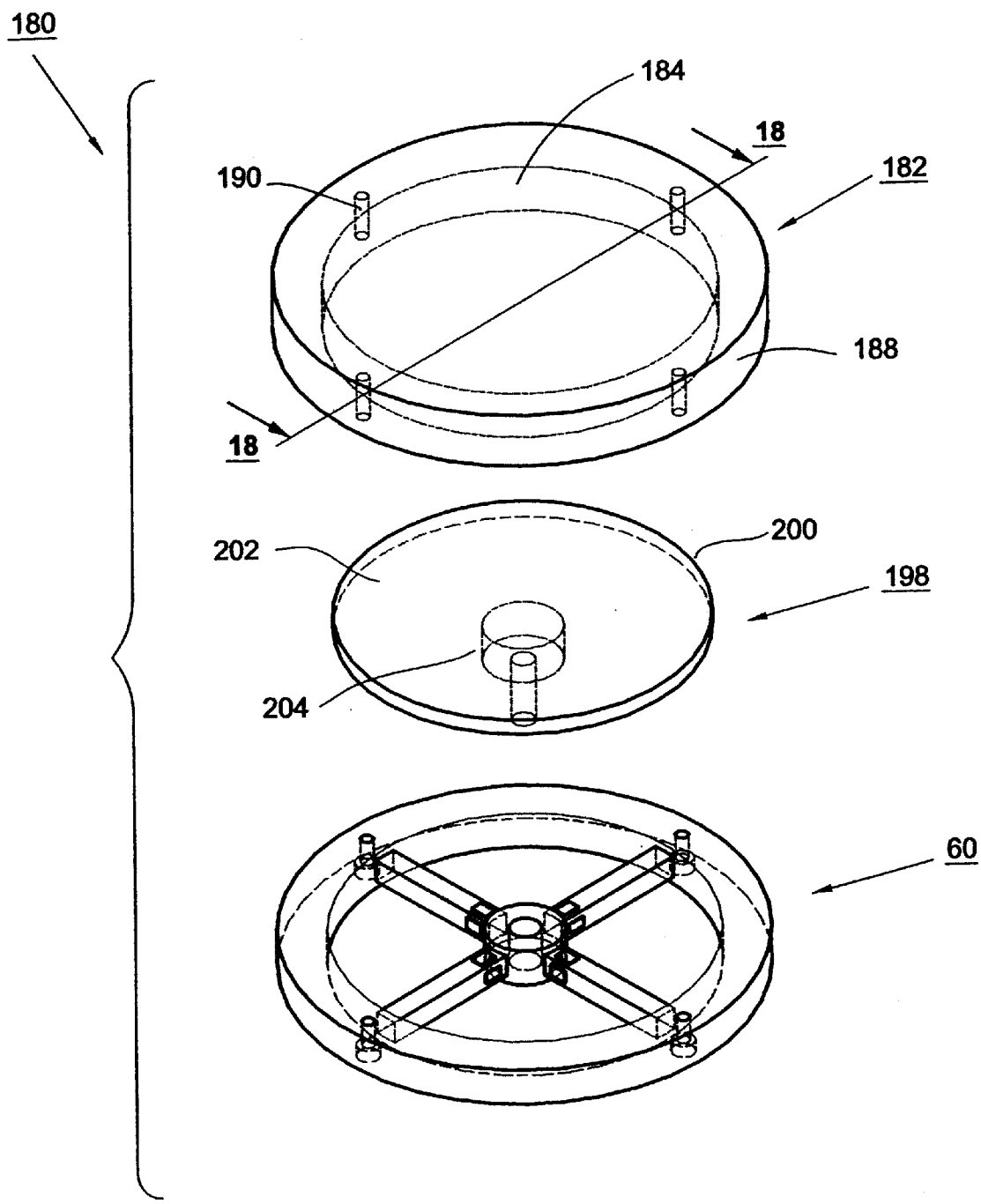
FIG. 17 is an exploded view of a fifth embodiment.
Figure 18:
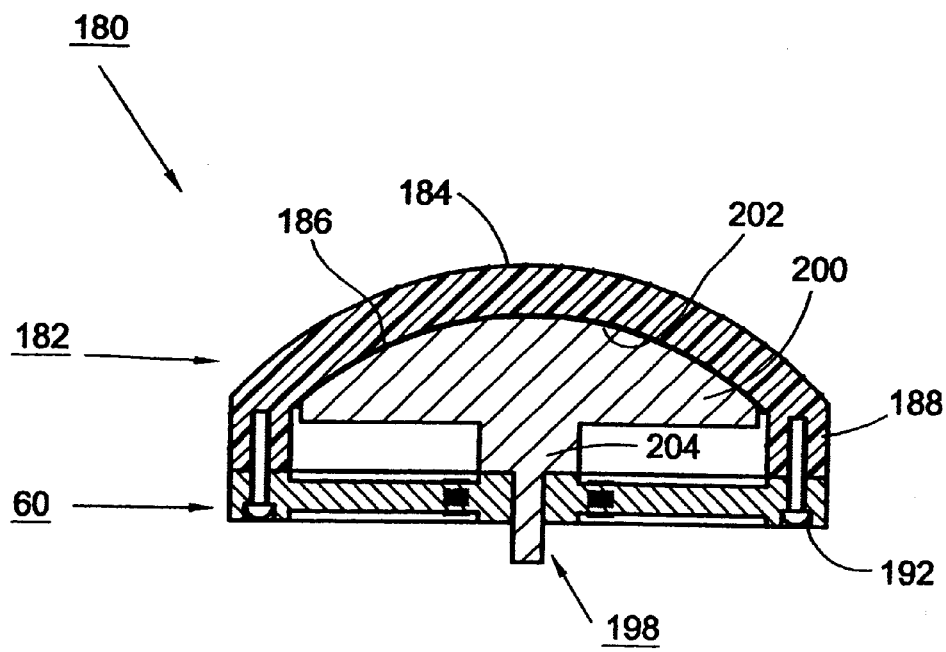
FIG. 18 is a sectional view of a fifth embodiment along line 18 to 18.
Figure 19:
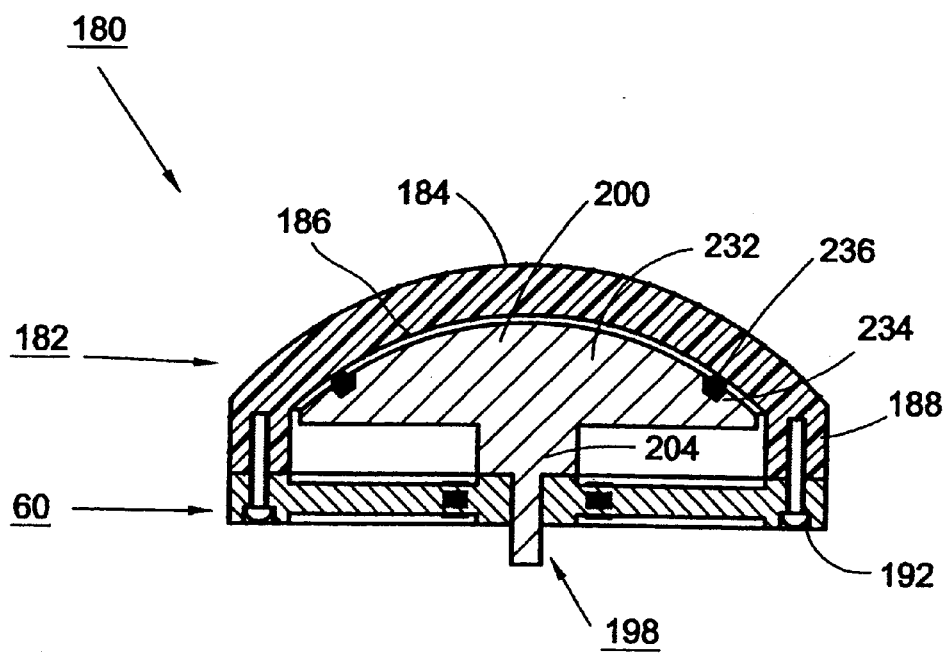
FIG. 19 is a sectional view of an alternative construction of the fifth embodiment.

Another embodiment of a touch control input device according to the present invention is shown in FIG. 17 through 19. FIG. 17 is an illustration of a input device 180 shown in an exploded view and FIG. 18 is an illustration of the input device 180 shown in a cross sectional view. The input device180 generally includes a user-manipulable movable member 182, a support 198 and a force transfer member 60 as described in the first embodiment.

The user-manipulable member 182 generally comprises a convex spherical exterior contact surface 184 and an interior surface 186 that is spherical in shape and concentric with the spherical exterior contact surface 184. The support 198 generally comprises a bearing body 200. The interior surface 186 of the user-manipulable member 182 bears on a bearing surface 202 provided by the bearing body 200. The bearing surface 202 is spherical in shape and has the same radius as the interior surface 186 such that the user manipulable member 182 can be movable around a center of curvature of the exterior contact surface 184.

The outer rim 64 of the force transfer member 60, FIG. 8, is located towards the periphery 188 of the user-manipulable member 182. The user-manipulable member 182 may provide a plurality of mounting holes 190 at the periphery 188 to secure the force transfer member 60, such that the user contact force on the contact surface 184 can be transmitted to the spokes 66 of the force transfer member 60. The securing means can be screws 192 as shown, or by other mechanical means such as rivetting, welding or by adhesives. The center hub 62 of the force transfer member 60 is mounted to a center column section 204 on the bearing body 200 of the support 198. The user-manipulable member 182 is therefore constrained to move around the centre of curvature of the contact surface 184. In this manner, the normal force $F_{normal}$ of the contact pressure will not induce any strain on the flexible force sensing member. The bending moments detected in the spokes 66 of the force transfer member 60 are directly related to the tangential force $F_{tangent}$ along the x, y, and z-axis.

The friction between the inner surface of the movable member and the support surface may introduce a threshold barrier to sensing any tangential force. More specifically, the force detected by the force sensing means is the tangential force less the friction between the surfaces. In some circumstances, the small threshold barrier may be beneficial to a touch-sensitive input apparatus. This provides a mechanically based dampening effect to suppress any disturbances that may be caused by, for example, hand tremor. In fact, U.S. Pat. No. 5,764,319 to Rutledge et al. in which a dead band zone is deliberately introduced in the software transfer function of an isometric joystick controller to provide a software threshold resistance to movement. The introduction of a small friction threshold in this embodiment is a mechanical solution which has the advantage of eliminating delay due to software computation.

However, to limit or eliminate the threshold, friction modification between the two elements can be used. Polytetrafluoroethene (PTFE), commercially available as Teflon manufactured by DuPont, is a suitable low friction material. The threshold resistance caused by the friction can be minimized by applying a coating of PTFE material to the bearing surfaces, that is, the interior spherical surface 186 of the user-manipulable member 182 and the spherical bearing support surface 202. Or, the movable member 182 and the bearing body 200 may be made from PTFE modified material.

Another solution to the threshold resistance issue is illustrated in an alternative construction of embodiment 180 as illustrated in FIG. 19 which shows a cross sectional view. All the parts in this alternative construction are the same as the last embodiment 180 except that there are a plurality of small pockets 234 on the bearing body 232. A plurality of spherical balls 236 are held in pockets 234 so that the spherical inner surface of the movable member is supported by ball bearings (FIG. 19), such that the movable member is constrained to move on the spherical balls 235 around its center of curvature. The rolling friction from the ball bearings is normally a small fraction of the sliding friction of two spherical surfaces in direct contact to substantially eliminate the threshold resistance. It is appreciated that any other friction reduction method may also be used to keep the threshold resistance under control.

As mentioned above, convexity is not a constraint to the configuration of the contact surface in the present invention. This can be illustrated in another embodiment similar in construction to the fifth embodiment 180 except with a spherical concave contact surface.

A sixth embodiment 240 of a touch control input device which was designed to perform in accordance with the above explained input control method will now be described with reference to FIG. 20 through 22.

Figure 20:
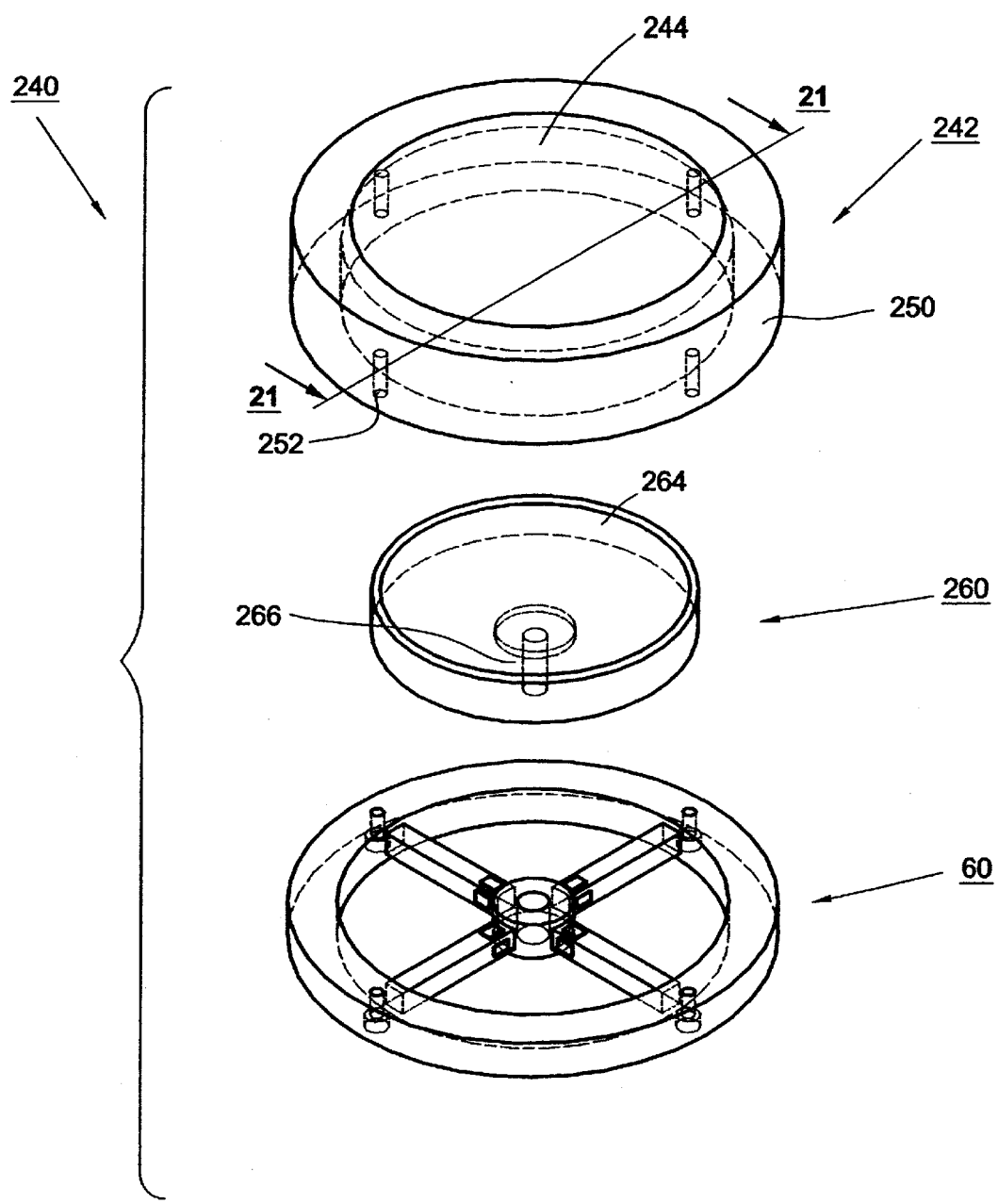
FIG. 20 is an exploded view of a sixth embodiment.
Figure 21:
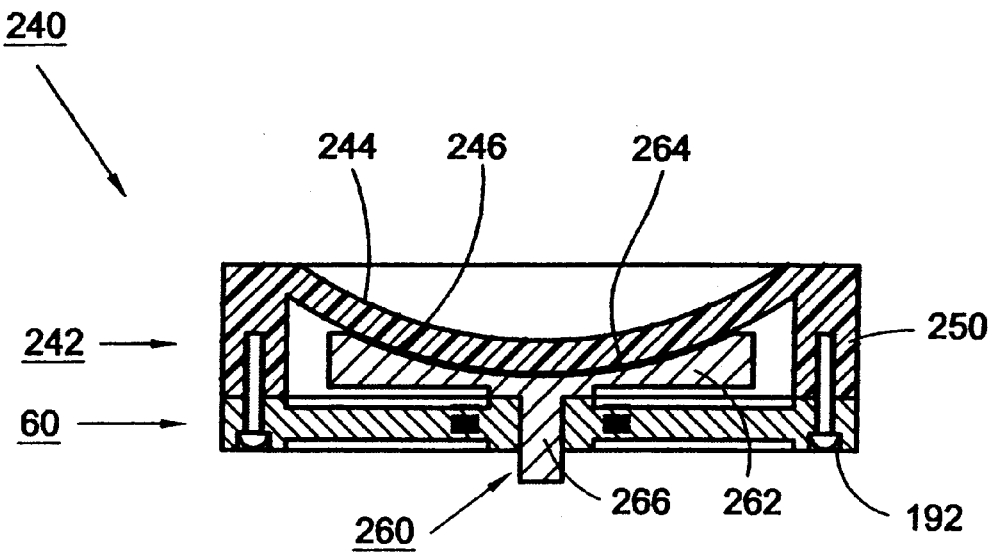
FIG. 21 is a sectional view of a sixth embodiment along line 21—21.
Figure 22:
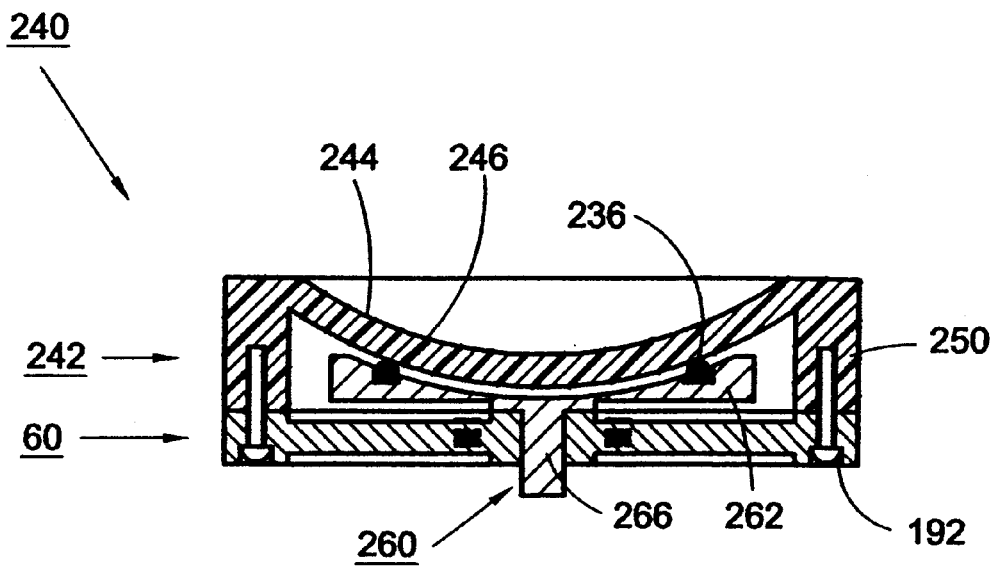
FIG. 22 is a sectional view of alternative construction of the sixth embodiment.

FIG. 20 is an illustration of the input device 240 shown in an exploded view and FIG. 21 is an illustration of the device 240 shown in a cross sectional view. The input device 240 is a variation of the last embodiment 180 and generally includes a user-manipulable movable member 242, the force transfer member 60 that was described in the first embodiment, and a support 260.

The user-manipulable member 242 is similar in construction to the user-manipulable member 182 of the last embodiment and generally comprises a concave spherical exterior contact surface 244 and an interior surface 246 that is spherical in shape and concentric with the spherical exterior contact surface 244. Similarly the support 260 comprises of a concave bearing body 262 on the base 210 which was described in the previous embodiment. The interior surface 246 of the user-manipulable member 242 bears on a bearing surface 264 provided by the bearing body 262. The bearing surface 264 is spherically concave in shape and has the same radius as the interior surface 246 such that the user-manipulable member 242 is movable around a center of curvature of the exterior contact surface 244.

The outer rim 64 of the force transfer member 60, FIG. 9, is mounted to the periphery 250 of the user-manipulable member 242. The user-manipulable member 242 may provide a plurality of mounting holes 252 at the periphery 250 to secure the force transfer member 60, such that the user contact force on contact surface 244 is transmitted to the spokes 66 of the force transfer member 60. The securing means can be screws 192 as shown, or by other mechanical means such as riveting, welding or by adhesives. The center hub 62 of the force transfer member 60 is disposed to a center column section 266 on the bearing body 262 of the support 260.

The user-manipulable member 242 is therefore configured and constrained to move around its center of curvature. It will be apparent to those skilled in the art that the normal force $F_{normal}$ of the contact pressure will not induce any strain on the flexible force-sensing member. The bending moments detected in the spokes 66 of the force transfer member 60 are direct measurements of components of the tangential force $F_{tangent}$ along the x, y, and z-axis.

Similar to the last embodiment, the bearing surface 264 and the interior surface 246 that are in direct contact may be coated with PTFE or the bearing body 262 and the user-manipulable member may be made from PTFE modified material to reduce the threshold resistance. Alternatively, ball bearings may be used to achieve the same purpose as shown in the alternative construction as shown in FIG. 22.

Figure 23:
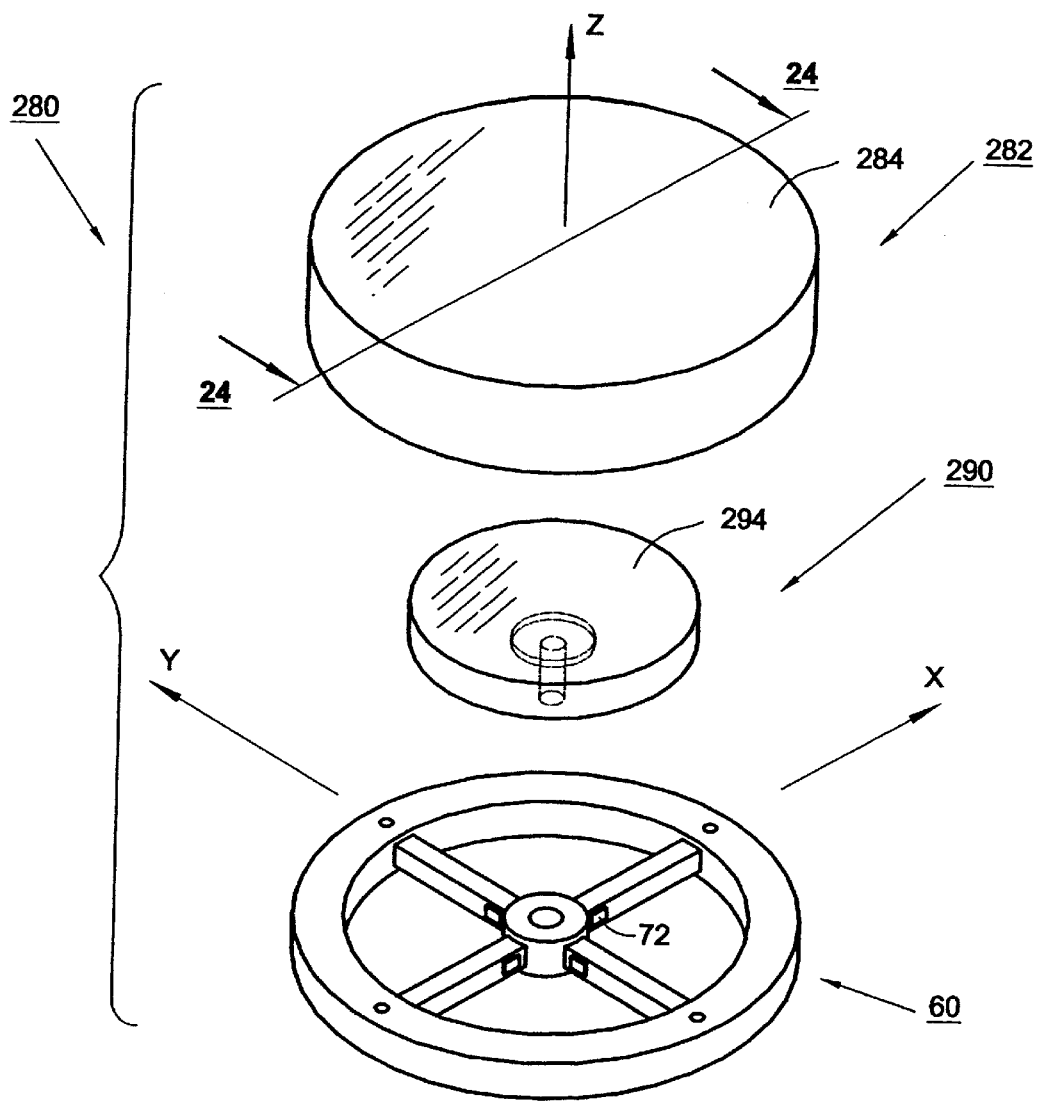
FIG. 23 is an exploded view of a further embodiment.
Figure 24:
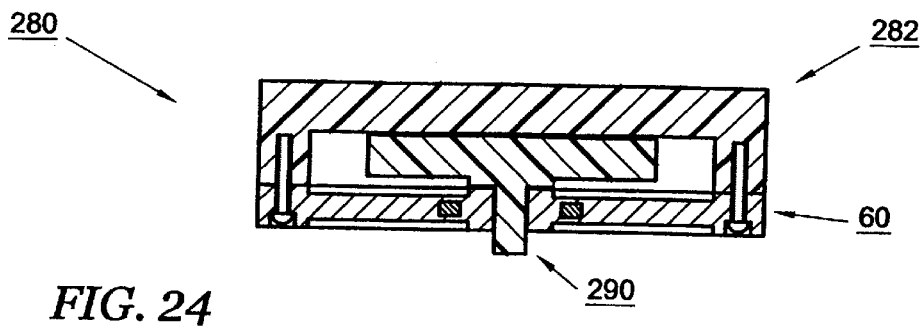
FIG. 24 is a sectional view through the embodiment of FIG. 23 along line 24 to 24.

A Planar surface can also be represented by simple mathematical expression. Similar to the embodiments for the spherical contact surface, it is possible to detect the tangential force on a planar contact surface directly such that the calculation steps can be simplified enough to provide instantaneous responses. This is illustrated in a further embodiment 280 of the present invention as shown in FIGS. 23 through 24. The construction of this embodiment is similar to the last embodiment in which a movable manipulable member 282 provides a planar contact surface 284 for user contact. The movable member 282 is constrained to move in a horizontal x-y plane by a horizontal planar bearing surface 294 provided by a support 290. The same force-transfer member 60 is used in this construction. Only the set of strain gauges 72 mounted on the vertical side of the spokes 66 of the force transfer member 60 will be responsive to the horizontal tangential force, FIG. 9. The force components can be measured by summing the respective strain gauge signals.

What has been disclosed is a method and a device of simple construction, which provides an integral and intuitive touch control user interface for object movement and cursor control. Although the invention has been described in terms of preferred embodiments, other embodiments are also within the scope of this invention as defined by the appended claims. Some of these embodiments have been discussed above, while others will be apparent to those skilled in the art. For example, many different configurations of force transducers and different types of force sensors can be used, provided that the force of the user's touch controls the sensitivity of object movement such that a greater force equals higher gain and provided that the direction and speed of movement is controlled by the movement by the user contact on the touch control input device.

The embodiments of the invention in which an exclusive property or privilege is claimed are defined as follows:

1. A method of touch control of an input device, said method comprising the steps of:
   providing a user manipulable member having a contact surface of known configuration mounted in a support and having a force sensing means operatively connected to said contact surface for sensing user contact with said contact surface;
   contacting said contact surface to cause said force sensing means to generate output signals corresponding to said user contact;
   using said output signals to provide a relative measure of a tangential force applied to said contact surface by said user contact; and
   using said relative measure of said tangential force to control a movement of an object in response to said user contact with said contact surface by using a direction of said tangential force to determine a direction of movement of said object and using a relative magnitude of said tangential force to determine a speed of said object and to modify a gain for controlling said object movement.

2. A method of touch control of an input device as claimed in claim 1 wherein said step of contacting said contact surface generates output signals which are directly related to the magnitude of said tangential force at said contact surface.

3. A method of touch control of an input device as claimed in claim 1 wherein said step of using said output signals further comprises contacting said contact surface with more force to cause said object to move faster and contacting said contact surface with less force to cause said object to move more slowly.

4. A method of touch control of an input device as claimed in claim 1 wherein said step of using said output signals further comprises increasing said gain in response to a more forceful contact with said contact surface whereby a relatively small movement of said user contact generates a relatively large said object movement and reducing said gain in response to a less forceful contact with said contact surface whereby a relatively large movement of said user contact generates a relatively small said object movement.

5. A method of touch control of an input device as claimed in claim 1 wherein said output signals are further modified by a value assigned to said object.

6. A method of touch control of an input device as claimed in claim 1 wherein said contact surface of known configuration is part spherical and said step of contacting said contact surface to cause said force sensing means to generate said output signals corresponding to said user contact further comprises positioning said sensing means to sense said tangential force at positions related to a centre of said part spherical surface.

7. A method of touch control of an input device as claimed in claim 1 wherein said contact surface of known configuration is part planar and said step of contacting said contact surface to cause said force sensing means to generate said output signals corresponding to said user contact further comprises positioning said sensing means to sense forces on a plane parallel to said planar surface.

8. A method of touch control of an input device as claimed in claim 1 wherein said force sensing means is in the form of a integral spoked wheel having instrumented spokes and said step of using said output signals includes providing for three dimensional control over the movement of said object.

9. A method of touch control of an input device as claimed in claim 1 wherein said force sensing means is in the form of an instrumented flat plate and said step of using said output signals includes providing for two dimensional control over the movement of said object.

10. A method of controlling movement of objects through the tough control of input device, said method comprising:
    providing a user manipulable member having a contact surface of known configuration supported in a support and having a force sensing means operatively connected to said contact surface for sensing user contact;
    positioning said sensing means to provide output signals related to a tangential force generated at said contact surface upon said contact surface being contacted;
    manipulating said contact surface to cause said sensing means to produce said output signals; and
    using said output signals to effect control of both an object's direction movement as well as the sensitivity of response of said object movement to said user contact by using a direction of said tangential force to determine a direction of movement of said object and using a relative magnitude of said tangential force to determine a speed of said object and to modify a gain for controlling said object movement.

11. An ergonomic touch control input device, said device comprising:
    a manually manipulable user interface having a contact surface of known configuration;
    a support in which said manipulable member is mounted; and
    a force sensing means operatively connected to said manipulable member for sensing user contact with said contact surface, said sensing means sensing a force vector applied to said contact surface and isolating a component tangential to said surface, and generating output signals related to said component for use in controlling an object's movement and a gain to effect movement control of said object all in response to said user contact.

12. An ergonomic touch control input device as claimed in claim 11 wherein said contact surface is at least part spherical.

13. An ergonomic touch control input device as claimed in claim 12 wherein said part spherical surface is convex.

14. An ergonomic touch control input device as claimed in claim 13 further including a column member extending from said part spherical contact surface section operatively connected to said force sensing means.

15. An ergonomic touch control input device as claimed in claim 14 wherein said force sensing means is in the form of a integral spoked wheel having instrumented spokes for three dimensional control of said object movement.

16. An ergonomic touch control input device as claimed in claim 14 wherein said force sensing means is in the form of a flat plate for two dimensional control of said object movement.

17. An ergonomic touch control input device as claimed in claim 14 wherein said column member extends to a base and ends at a center of said part spherical contact surface.

18. An ergonomic touch control input device as claimed in claim 13 wherein said force sensing means is an instrumented column member attached to a support at a location wherein said location substantially corresponds to a center of a curvature of said spherical surface and said output signals are used to provide two dimensional control of said object movement.

19. An ergonomic touch control input device as claimed in claim 12 wherein said part spherical surface is concave.

20. An ergonomic touch control input device as claimed in claim 12 wherein said force sensing means senses forces at positions corresponding to a center of said part spherical surface, wherein said forces are related to the tangential component applied at said contact surface.

21. An ergonomic touch control input device as claimed in claim 11 wherein said contact surface is at least part planar.

22. An ergonomic touch control input device as claimed in claim 11 wherein said force sensing means senses a direction of said tangential component to be related to a direction of movement of said object, and said sensing means measures a magnitude of said tangential component which is related to a speed of said object movement and said gain for movement control.

23. An ergonomic touch control input device as claimed in claim 22 wherein said output signals are related to said object movement wherein the larger said tangential force the faster a speed of said object movement and the smaller said tangential force the slower a speed of said object movement.

24. An ergonomic touch control input device as claimed in claim 11 wherein said output signals are related to said object movement in a manner such that a more forceful contact increases said gain whereby a relatively small movement of said user contact generates a relatively large object movement and a less forceful contact reduces said gain whereby a relatively large movement of said user contact generates a relatively small object movement.

25. An ergonomic touch control input device as claimed in claim 11 further including a bearing surface for said manually manipulable member.

26. An ergonomic touch control input device as claimed in claim 25 wherein said contact surface is part spherical and said bearing surface is part spherical and is sized and shaped to fit concentrically into said manually manipulable member.

27. An ergonomic touch control input device as claimed in claim 26 further including a friction reducing means between said bearing surface and said manually manipulable member.

28. An ergonomic touch control input device as claimed in claim 26 wherein said friction reducing means comprises at least in part using a low friction material at an interface between said bearing surface and said manually manipulable member.

29. An ergonomic touch controlled input device, said device comprising:

a manually manipulable member having a contact surface of known configuration for a user to touch;

a support structure for said member;

an instrumentation means operatively connected to the support to measure the direction and a magnitude of a tangential component of a user contact force with said contact surface;

wherein said instrumentation means generates output signals to control the movement of an object in accordance with the movement of said touch on said contact surface and further provides output signals that are related to said magnitude of force being exerted by the user on said contact surface to control the response sensitivity of said object movement to said user contact.

* * * * *